US011888200B2

(12) United States Patent
Pirbazari et al.

(10) Patent No.: US 11,888,200 B2
(45) Date of Patent: Jan. 30, 2024

(54) PLANT-SEDIMENT MICROBIAL FUEL CELL SYSTEM FOR WASTEWATER TREATMENT WITH SELF-CONTAINED POWER SUSTAINABILITY

(71) Applicant: University of Southern California, Los Angeles, CA (US)

(72) Inventors: Massoud Pirbazari, Los Angeles, CA (US); Varadarajan Ravindran, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 832 days.

(21) Appl. No.: 16/975,029

(22) PCT Filed: Feb. 25, 2019

(86) PCT No.: PCT/US2019/019427
§ 371 (c)(1),
(2) Date: Aug. 21, 2020

(87) PCT Pub. No.: WO2019/165373
PCT Pub. Date: Aug. 29, 2019

(65) Prior Publication Data
US 2023/0163336 A1 May 25, 2023

Related U.S. Application Data

(60) Provisional application No. 62/634,368, filed on Feb. 23, 2018.

(51) Int. Cl.
*H01M 8/16* (2006.01)
*H01M 8/04111* (2016.01)
(Continued)

(52) U.S. Cl.
CPC ............... *H01M 8/16* (2013.01); *C02F 1/283* (2013.01); *C02F 3/005* (2013.01); *C02F 3/327* (2013.01);
(Continued)

(58) Field of Classification Search
CPC .. H01M 8/16; H01M 4/9083; H01M 8/04111; C02F 1/283; C02F 3/005;
(Continued)

(56) References Cited

U.S. PATENT DOCUMENTS 10,968,124 B2 * 4/2021 Yang .................. C02F 1/46109
2007/0259217 A1 * 11/2007 Logan ................. H01M 4/9008
429/492
(Continued)

FOREIGN PATENT DOCUMENTS

| CN | 105858902 A | 8/2016 |
|---|---|---|
| KR | 10-2015-0144663 A | 12/2015 |
| KR | 10-2017-0016654 A | 2/2017 |

OTHER PUBLICATIONS

Xu, Bojun et al., "Sediment microbial fuel cells for wastewater treatment: challenges and opportunities", Environmental Science: Water Research & Technology, 2015, vol. 1, No. 3, pp. 279-284.
(Continued)

*Primary Examiner* — Muhammad S Siddiquee
(74) *Attorney, Agent, or Firm* — SNELL & WILMER LLP

(57) ABSTRACT

Methods, systems, and apparatus for treating wastewater and generating electricity. The system includes layers of sediment containing microorganisms for treating the wastewater. The system includes layers of granular activated carbon or granular activated carbon with graphene oxide or sand with graphene oxide disposed on top of the sediment layers for enhancing electron transfer, current generation rate, and
(Continued)

wastewater treatment. The system also includes one or more anodes and one or more cathodes located on top of the layers of granular activated carbon or granular activated carbon with graphene oxide or sand with graphene oxide. The one or more anodes and the one or more cathodes are configured to generate electrical voltage. The system also includes a battery connected to the one or more anodes and the one or more cathodes and configured to store the electrical voltage generated by the one or more anodes and the one or more cathodes.

20 Claims, 15 Drawing Sheets

Specification includes a Sequence Listing.

(51) Int. Cl.
  *H01M 4/90*   (2006.01)
  *C02F 3/32*   (2023.01)
  *C02F 1/28*   (2023.01)
  *C02F 3/00*   (2023.01)
(52) U.S. Cl.
  CPC ...... *H01M 4/9083* (2013.01); *H01M 8/04111* (2013.01); *C02F 2201/009* (2013.01)

(58) Field of Classification Search
  CPC .............. C02F 3/327; C02F 2201/009; C02F 2209/005; Y02A 20/212; Y02E 60/50; Y02W 10/10; Y02W 10/37
  See application file for complete search history.

(56) References Cited

U.S. PATENT DOCUMENTS

| | | | |
|---|---|---|---|
| 2017/0133700 A1* | 5/2017 | Lozano | H01M 8/0202 |
| 2019/0119133 A1* | 4/2019 | Jin | C02F 3/109 |
| 2021/0061687 A1* | 3/2021 | Reguera | C02F 3/005 |
| 2022/0064035 A1* | 3/2022 | Wu | C02F 3/005 |
| 2023/0163336 A1* | 5/2023 | Pirbazari | C02F 1/283 |
| | | | 429/2 |

OTHER PUBLICATIONS

Velasquez-Orta, S.B. et al., "Microbial fuel cells for inexpensive continuous in-situ monitoring of groundwater quality", Water Research, 2017, vol. 117, pp. 9-17.

International Search Report and Written Opinion of the International Search Authority (dated Jun. 7, 2019) for Corresponding International PCT Patent Application No. PCT/US2019/019427.

* cited by examiner

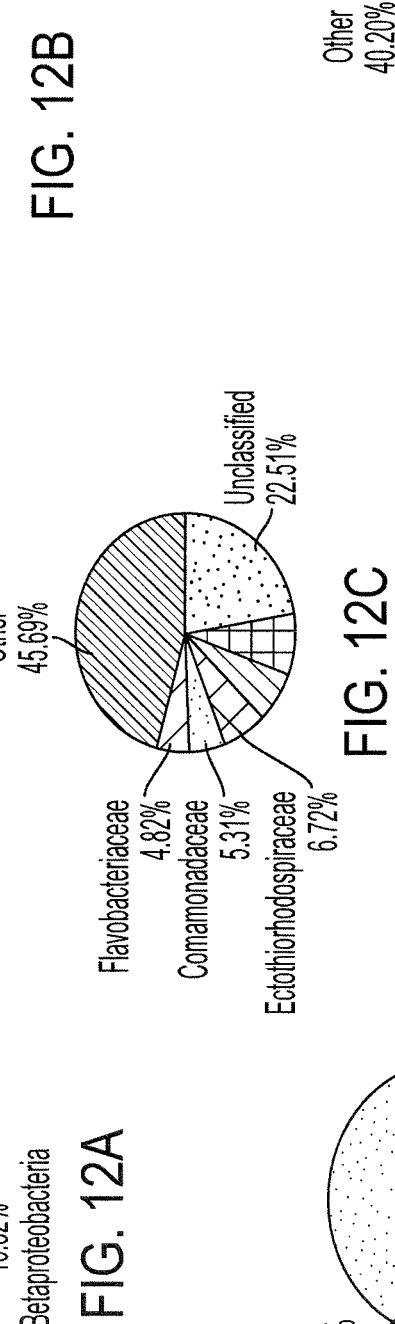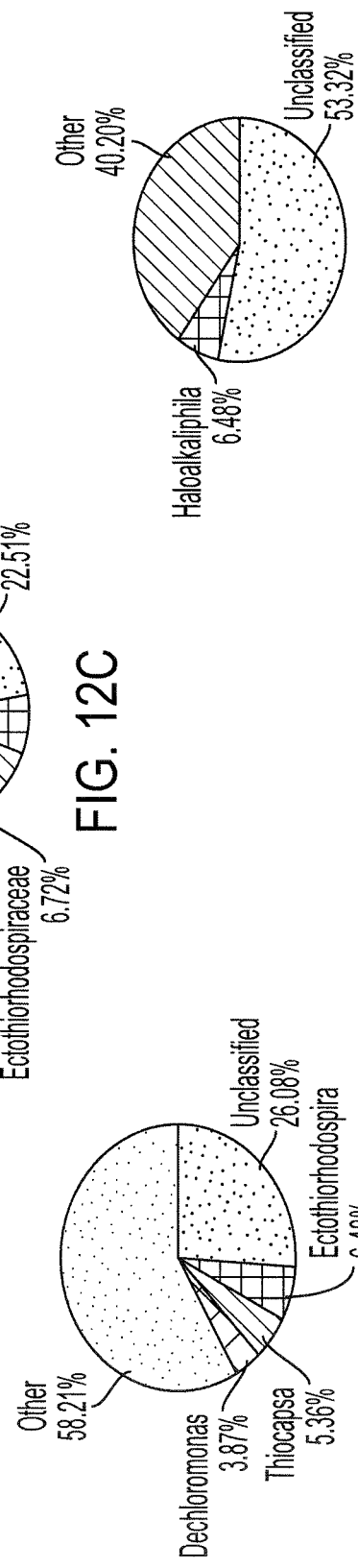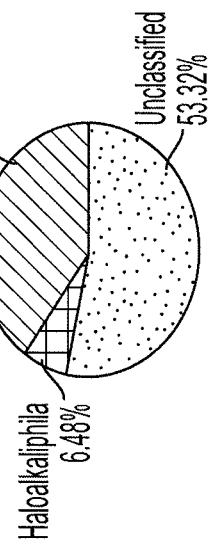
FIG. 12A
FIG. 12B
FIG. 12C
FIG. 12D
FIG. 12E

SEQUENCE LISTING

<160> NUMBER OF SEQ ID NOS: 2

<210> SEQ ID NO 1
<211> LENGTH: 18
<212> TYPE: DNA
<213> ORGANISM: Artificial Sequence
<220> FEATURE:
<223> OTHER INFORMATION: Forward Primer - Com1-F

<400> SEQUENCE: 1
cagcagccgc gctaatac                                               18

<210> SEQ ID NO 2
<211> LENGTH: 19
<212> TYPE: DNA
<213> ORGANISM: Artificial Sequence
<220> FEATURE:
<223> OTHER INFORMATION: Reverse Primer - Com1-R

<400> SEQUENCE: 2
ccgtcaattc ctttgagtt                                              19

PLANT-SEDIMENT MICROBIAL FUEL CELL SYSTEM FOR WASTEWATER TREATMENT WITH SELF-CONTAINED POWER SUSTAINABILITY

CROSS REFERENCE TO RELATED APPLICATIONS

This application is a national stage entry from PCT Application No. PCT/US19/19427, entitled "Plant-Sediment Microbial Fuel Cell System for Wastewater Treatment with Self-Contained Power Sustainability," filed on Feb. 25, 2019, which claims the benefit and priority of U.S. Provisional Application Ser. No. 62/634,368, entitled "Plant-Sediment Microbial Fuel Cell System for Wastewater Treatment with Self-Contained Power Sustainability," filed on Feb. 23, 2018, the contents of which are hereby incorporated by reference in its entirety herein.

SEQUENCE LISTING

The Sequence Listing originally submitted in this application is incorporated herein by reference. The text file of the Sequence Listing is named 7152308200_SL.txt and the file size is 1 kilobyte.

BACKGROUND

1. Field

This specification relates to a system and a method for treating wastewater while also generating electrical energy to self-sustain the system.

2. Description of the Related Art

A microbial fuel cell (MFC) is a bioreactor that converts chemical energy in the chemical bonds in organic compounds to electrical energy through catalytic reactions of microorganisms under anaerobic conditions. It has been known that it is possible to generate electricity directly by using bacteria to break down organic substrates.

SUMMARY

What is described is a plant-sediment microbial fuel cell system. The system includes a single-chamber reactor. The single-chamber reactor includes a bottom surface and one or more walls defining a cavity, a bottom opening near a bottom end of the reactor, and a top opening near a top end of the reactor. The system also includes a wastewater inlet tube connected to the bottom opening and configured to supply the single chamber reactor with wastewater to be treated. The system also includes a treated water outlet tube connected to the top opening and configured to emit treated water. The system also includes a first layer of gravel disposed on the bottom surface of the single chamber reactor. The system also includes a first layer of sediment disposed on top of the first layer of gravel and containing microorganisms for treating the wastewater. The system also includes a first layer of granular activated carbon or granular activated carbon with graphene oxide or sand with graphene oxide disposed on top of the first layer of sediment for enhancing electron transfer, current generation rate, and wastewater treatment. The system also includes one or more anodes located on top of the first layer of granular activated carbon or granular activated carbon with graphene oxide or sand with graphene oxide. The system also includes a second layer of gravel disposed on top of the one or more anodes. The system also includes a second layer of sediment disposed on top of the second layer of gravel and containing microorganisms for treating the wastewater. The system also includes a second layer of granular activated carbon or granular activated carbon with graphene oxide or sand with graphene oxide disposed on top of the second layer of sediment for enhancing electron transfer, current generation rate, and wastewater treatment. The system also includes one or more cathodes located on top of the second layer of granular activated carbon or granular activated carbon with graphene oxide or sand with graphene oxide, the one or more anodes and the one or more cathodes configured to generate electrical voltage. The system also includes a battery connected to the one or more anodes and the one or more cathodes and configured to store the electrical voltage generated by the one or more anodes and the one or more cathodes.

Also described is a plant-sediment microbial fuel cell (PS-MFC). The PS-MFC includes a single chamber reactor having a bottom surface and one or more walls defining a cavity, a bottom opening near a bottom end of the reactor, and a top opening near a top end of the reactor, wastewater entering the single-chamber reactor from the bottom opening and exiting the single-chamber reactor as treated water from the top opening. The PS-MFC also includes a first layer of gravel disposed on the bottom surface of the single chamber reactor. The PS-MFC also includes a first layer of sediment disposed on top of the first layer of gravel and containing microorganisms for treating the wastewater. The PS-MFC also includes a first layer of granular activated carbon or granular activated carbon with graphene oxide or sand with graphene oxide disposed on top of the first layer of sediment for enhancing electron transfer, current generation rate, and wastewater treatment. The PS-MFC also includes one or more anodes located on top of the first layer of granular activated carbon or granular activated carbon with graphene oxide or sand with graphene oxide. The PS-MFC also includes a second layer of gravel disposed on top of the one or more anodes. The PS-MFC also includes a second layer of sediment disposed on top of the second layer of gravel and containing microorganisms for treating the wastewater. The PS-MFC also includes a second layer of granular activated carbon or granular activated carbon with graphene oxide or sand with graphene oxide disposed on top of the second layer of sediment for enhancing electron transfer, current generation rate, and wastewater treatment. The PS-MFC also includes one or more cathodes located on top of the second layer of granular activated carbon or granular activated carbon with graphene oxide or sand with graphene oxide, the one or more anodes and the one or more cathodes configured to generate electrical voltage.

Also described is a method for treating wastewater and generating electricity. The method includes receiving, by a single-chamber reactor via a wastewater inlet tube connected to a bottom opening of the single-chamber reactor, wastewater to be treated. The method also includes passing the wastewater through a first layer of gravel disposed on a bottom surface of the single-chamber reactor. The method also includes passing the wastewater through a first layer of sediment above the first layer of gravel, the first layer of sediment containing microorganisms for treating the wastewater. The method also includes passing the wastewater through a first layer of granular activated carbon or granular activated carbon with graphene oxide or sand with graphene oxide disposed on top of the first layer of sediment for enhancing electron transfer, current generation rate, and wastewater treatment. The method also includes passing the wastewater through one or more anodes located on top of the first layer of granular activated carbon or granular activated carbon with graphene oxide or sand with graphene oxide. The method also includes passing the wastewater through a second layer of gravel disposed on top of the one or more anodes. The method also includes passing the wastewater through a second layer of sediment disposed on top of the second layer of gravel and containing microorganisms for treating the wastewater. The method also includes passing the wastewater through a second layer of granular activated carbon or granular activated carbon with graphene oxide or sand with graphene oxide disposed on top of the second layer of sediment for enhancing electron transfer, current generation rate, and wastewater treatment. The method also includes passing the wastewater through one or more cathodes located on top of the second layer of granular activated carbon or granular activated carbon with graphene oxide or sand with graphene oxide. The method also includes generating, by the one or more anodes and the one or more cathodes, electrical voltage. The method also includes emitting, by the single-chamber reactor via a treated water outlet tube connected to a top opening of the single-chamber reactor, treated water. The method also includes storing, by a battery connected to the one or more anodes and the one or more cathodes the electrical voltage generated by the one or more anodes and the one or more cathodes.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 12A-12E illustrate the complete results of the microorganisms present in the sediment used in the plant sediment microbial fuel cell systems, according to various embodiments of the invention.

DETAILED DESCRIPTION

Figure 1:
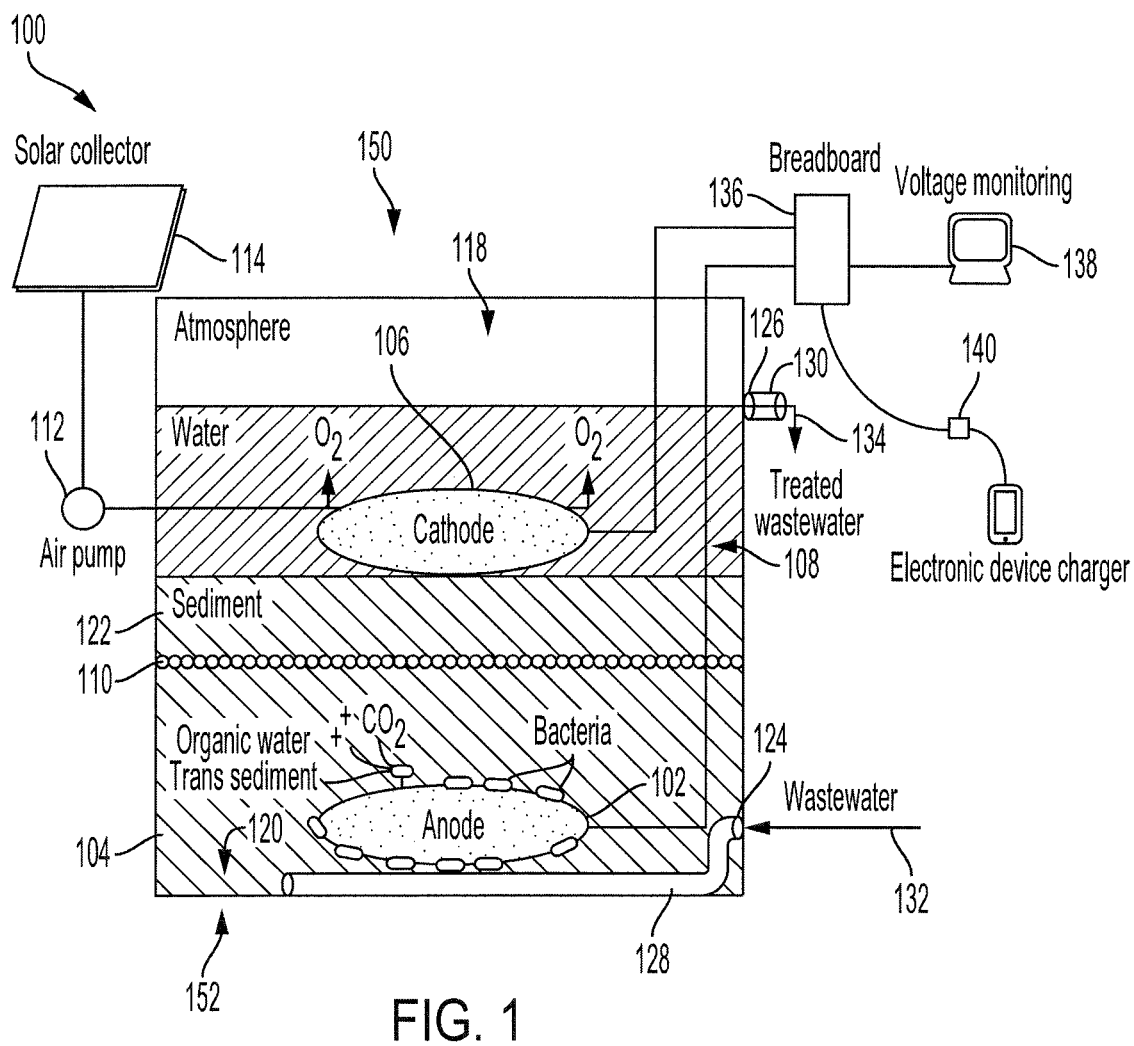
FIG. 1 illustrates a plant sediment microbial fuel cell system, according to various embodiments of the invention.

A microbial fuel cell (MFC) is a bioreactor that converts chemical energy in the chemical bonds in organic compounds to electrical energy through catalytic reactions of microorganisms under anaerobic conditions. It is possible to generate electricity directly by using bacteria to break down organic substrates. The recent energy crisis has reinvigorated interests in MFCs among academic researchers as a way to generate electric power or hydrogen from biomass without a net carbon emission into the ecosystem. MFCs can be used in wastewater treatment facilities to break down organic matter. They may also be used as biosensors, such as sensors for biological oxygen demand (BOD) monitoring.

Power output and Coulombic efficiency are significantly affected by (1) the types of microbes in the anodic chamber of an MFC, (2) configuration of the MFC, and (3) operating conditions. Currently, real-world applications of MFCs are limited because of their low power density level of several thousand mW/m$^2$. Thus, there is a need for improved performance and reduction of construction and operating costs of MFCs. Conventional MFCs employ proton exchange membranes (PEMs), a factor that adds significantly to their operation and maintenance costs.

The MFC biosensors are avenues toward simple and sustainable monitoring for target analytes in water that can be operated in situ and online. The current generated by an MFC directly relates to the metabolic activity of the electroactive biofilm at the anode surface. Any disturbances of their metabolic pathways are translated into a change in the production of electricity. If operational parameters such as pH, temperature, and conductivity of the feeding solution are kept constant, this current change can be correlated to the specific disturbance applied.

Conventional wastewater treatment processes consume large amounts of energy. Furthermore, it is predicted that the energy demand for these systems will significantly increase in the near future. Conventional technologies for treating municipal, industrial, and agricultural wastewater are based on aerobic biological processes in which aeration accounts for between 65 to 75% of the energy required. If power generation in these systems can be increased, the microbial fuel cell technologies will provide new methods to offset the operating costs of conventional technologies, making advanced wastewater treatment more affordable in industrialized or developing nations.

A plant-sediment microbial fuel cell (PS-MFC) or sediment microbial fuel cell (S-MFC) system, as described herein, is designed for wastewater treatment with simultaneous power production to satisfy the energy needs of the system. The PS-MFC or S-MFC system employs a single chamber reactor and thus does not require the use of proton exchange membrane (PEM) to separate the anodic and cathodic chambers. Plants are employed so that their roots can provide extra nutrients and enzymes for enhanced degradation of contaminants such as chemical oxygen demand (COD), phosphates, nitrates, and sulfates, for example. The design facilitates sustained diurnal and nocturnal operation of the process, with power production for the operation of fluid and aeration pumps. The Coulombic efficiency of the cell is enhanced by a unique design of carbon-based electrode systems (anodes and cathodes). The electrodes are enclosed in media comprising granular activated carbon (GAC) coated with graphene oxide nanosheets (GAC-GO) or sand coated with graphene oxide nanoparticles (Sand-GO) that are embedded in sediment layers. Additionally, the novel design of PS-MFC reactor configuration and design features play an important role in increasing the process efficiency. In particular, the four sets of electrodes (anodes as well as cathodes) are strategically placed so that the liquid flow is uniformly distributed within the reactor reaching all sides of sediment beds uniformly. Furthermore, a set of air diffusers are located in the upper region of the reactor with appropriate spatial distribution around the cathode electrodes for uniform distribution of air bubbles. These design features improve the performance of the microbial fuel cell and enhance its sustainability and durability of operation.

In experiments, the removals of COD and phosphate were nearly 100 percent, while those of nitrate, and sulfate were 40%, and 35-40%, respectively. The studies conducted with carbon electrodes embedded in GAC or GAC-GO or Sand-GO yielded almost similar results with regard to power generation and contaminant removals. The effects of the materials used in the system, as described herein, were unexpected. Further, in the conducted experiments, the microbial system that was developed from sediments gradually evolved into electrogenic geobacter strain as shown by progressive PCR analyses of the population.

The PS-MFC system may use a solar panel connected to a battery for storing the electricity generated. The technology has commercial applications in the treatment of municipal wastewater, industrial wastewater, storm water, as well as water reclamation and reuse. The gravel, as described herein, may be any type of spherically shaped gravel that allows easy passage of water between the gravel pieces without causing excessive hydraulic headloss.

The microbial fuel cell (MFC) technology described herein is promising for harnessing the power of microorganisms to maximize environmental pollution control and simultaneously generate renewable electricity. The technology can be used for wastewater treatment, water reclamation, storm-water treatment, and polishing step in water purification operations. Although the power output of MFCs has increased by several orders of magnitude during the last decade, it is still low for practical applications. Therefore, one of the most important tasks is to increase the power production. Certain bacterial strains are capable of generating and transferring electrons from substrates to working electrode without the aid of external mediators. These representative strains include metal reducers such as Shewenella and Geobacter, and phototrophs such as Rhodopseudomonas. Several electron transfer mechanisms may be used, including direct electron transfer via membrane-bound c-type cytochromes or nanowires, and self-mediated electron transfer via endogenous redox-active metabolites. These mechanisms are important for providing guidance toward developing or selecting the effective and appropriate strains for enhanced power generation.

A fuel cell is an electrochemical device capable of coupling oxidation of a desired fuel in an anodic chamber, and the reduction of a sacrificial electron acceptor in the cathodic chamber. Conventional fuel cells have anodic and cathodic chambers that are divided by a separating membrane that has the ability to transport protons, balancing the charge generated by the fuel cell, while simultaneously maintaining a separation between the fuel supplies. The membrane employed is referred to as a proton transport or proton exchange membrane (PEM), generally composed of Nafion and similar fluoro-carbon polymers. The fuel oxidized in the cell may be hydrogen, methane, ethanol, formic acid or other organic compounds of choice, and the electron acceptor is primarily oxygen.

Microbial fuel cells (MFCs) constitute a unique subset of fuel cells that make use of microorganisms' population and takes advantage of the microbial biochemical reactions to generate fuels or directly to generate electricity. MFCs make use of domestic sewage, industrial effluents, leachates, sediments and rhizo-deposits as biodegradable substrates they constitute a viable technology for energy harnessing besides environmental pollution control. The fuels generated, such as hydrogen or methane can in turn be utilized by commercial fuel cells to generate electric current. Most microorganisms are capable of generating electricity if oxidation/reduction (redox) active media are added to the system or immobilized on the electrode(s). However, the addition of exogenous mediators lead to MFC systems that have limited or defined life-spans. Therefore, practical designs employ microbial populations that self-mediate or perform direct electron transfer through membrane-anode contact. This electron transfer occurs extracellularly through the microbial membrane proteins and or bacterial nano-wires. The advantages of using an MFC over an ordinary chemical fuel cell (CFC) technology or photovoltaic cells are that unpurified waste matter or biomass can be employed as fuel, and the system operation can be carried out in ambient conditions or darkness with no specific heat requirement for reaction activation.

MFCs offer an alternative approach to biogas for the recovery of energy from wastewater. MFCs include an anode and a cathode connected by an external circuit and separated by an electrolyte or wastewater. At the anode, certain bacteria, known as electrogens, are capable of transferring electrons to the anode during the oxidation of organic matter. The electrons are transferred through the external circuit to the cathode while protons (also released during the oxidation reaction) move through the wastewater to the cathode where they combine to reduce an electron acceptor to complete the circuit.

In order to function efficiently, the anode compartment of MFCs must remain anaerobic while freely available oxygen at the cathode will combine with protons and electrons to complete the circuit. In a flooded wetland system, anaerobic and aerobic conditions exist throughout the bed depth. Near the surface, aerobic conditions are likely to prevail; oxygen intrusion from the atmosphere in tandem with oxygen leakage from the rhizosphere of wetland plants should supply enough dissolved oxygen (DO) to sustain cathodic reactions, while increasing depth and water saturation will ensure anaerobic conditions in the wetland bed. The stratified redox conditions that exist may be exploited by incorporating an anode in the anaerobic section and a cathode in the aerobic section thereby creating an in-situ, non-destructive MFC. However, reliance on the natural stratified redox conditions to provide the required anaerobic condition at the anode and aerobic condition at the cathode results in large electrode separation, and accordingly higher internal resistances.

Scaling up of MFCs requires the development of compact reactor systems with multiple electrodes. Improvements in performance efficiencies can be achieved by optimizing the following important factors: (1) Reducing the electrode spacing while avoiding oxygen contamination of the anode; (2) Increasing solution conductivity (liquid phase conductivity) to reduce the electrical resistance losses; (3) Pre-acclimating the microbial population to maximize the electrogenic activity of the microorganisms; and (4) Employing relatively inexpensive or low-cost materials for electrodes, separators and other components.

Scaling up MFC systems requires the application of compact reactor designs and multiple electrodes (anodes and cathodes). The general notion is that electrodes must be closely spaced to minimize losses due to electrical resistances. However, this must be viewed with caution, as closer spacing of electrodes can also decrease MFC performance due to oxygen crossover from the anode to the cathode—a major factor that can reduce power output and coulombic efficiency due to aerobic respiration of the bacterial population. The oxygen crossover can be reduced by the use of ion exchange membranes such as proton exchange membranes (PEMs). However, the use of such membranes can substantially reduce the power production.

Figure 2:
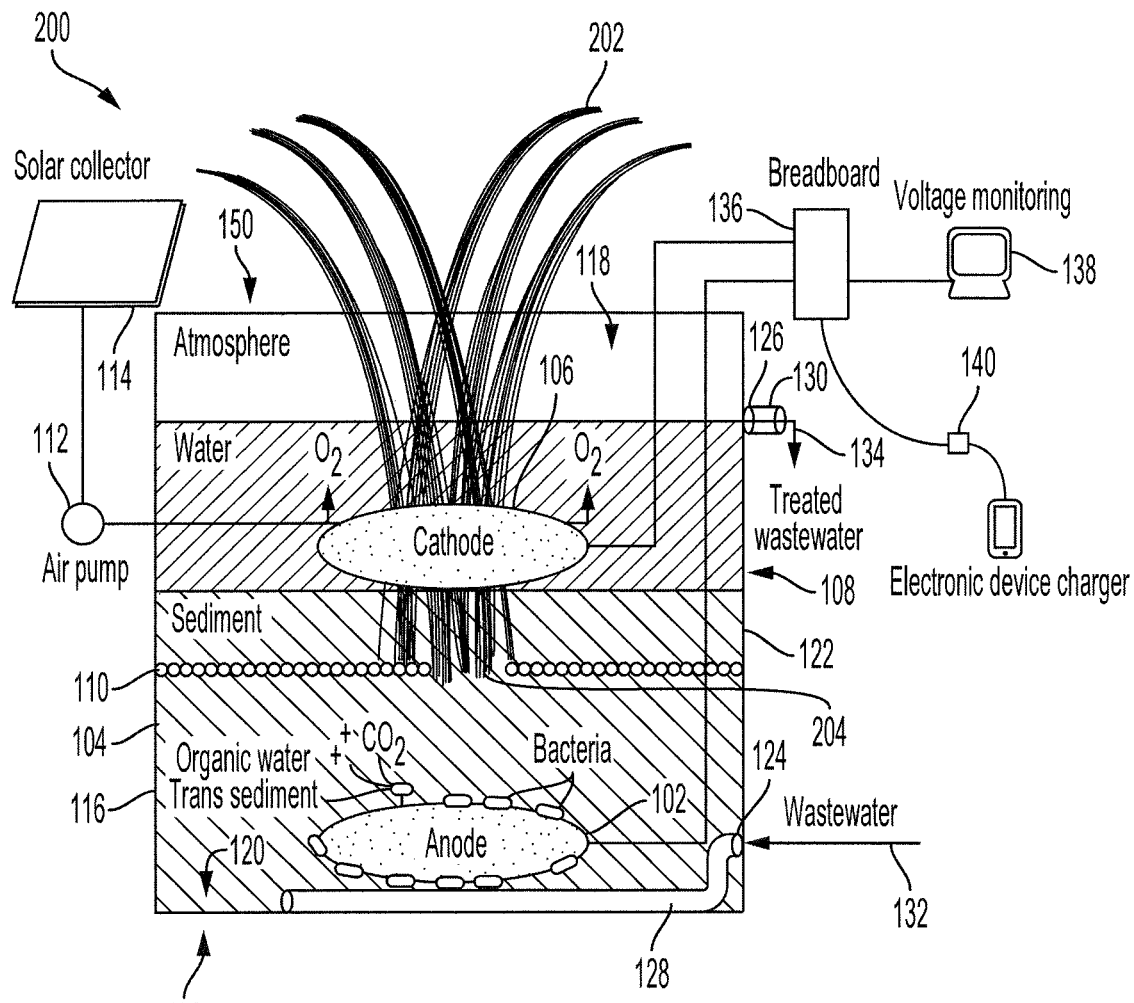
FIG. 2 illustrates a plant sediment microbial fuel cell system with a plant, according to various embodiments of the invention.

FIG. 1 illustrates a plant-sediment microbial fuel cell (PS-MFC) reactor system 100 without plants, and FIG. 2 represents the system 200 with the use of plants 202. The second reactor in FIG. 2 is able to take advantage of the organic exudates from the roots of the plants 202. A comparison of both systems provides information on the efficacy of using plants in such operations.

The system 100 includes a single-chamber reactor 116 having a bottom surface 120, one or more walls 122 defining a cavity 118, a top end 150 and a bottom end 152. The single-chamber reactor 116 includes a bottom opening 124 and a top opening 126. A wastewater inlet tube 128 may be connected to the bottom opening 124 and may be configured to supply the single-chamber reactor 116 with wastewater 132 to be treated. A treated water outlet tube 130 may be connected to the top opening 126 and configured to emit treated water 134.

The anode 102 is immersed or buried in the sediment layer 104 while the cathode 106 is at the top of the sediment in contact with the aqueous phase 108. The sediment layer 104 is covered by gravel 110. In some embodiments, the gravel 110 has particles of size 10-12 mm (in diameter).

The system 100 includes an air pump 112 to provide a supply of oxygen to the cathode 106. The system 100 includes a solar collector 114, which harnesses energy from sunlight (or any form of light) to operate the air pump 112.

The system 100 also includes an electronic board 136 connected to the anode 102 and the cathode 106. The electronic board 136 may be a circuit board, such as a breadboard or a printed circuit board. A voltage monitoring device 138 may be connected to the electronic board 136 and may be configured to monitor the voltage generated from the system 100. An electronic device 140, such as a charger for a mobile device may be connected to the electronic board 136 and may receive the electricity generated by the system 100. In some embodiments, a battery or other electricity storage device is connected to the anode 102 and the cathode 106 and receives and stores the electricity generated by the system 100. Thus, while the wastewater 132 is converted to treated water 134, electricity is also generated.

FIG. 2 illustrates a system 200 having all of the components of the system 100 illustrated in FIG. 1 (e.g., anode 102, sediment 104, cathode 106, aqueous phase 108, gravel 110, air pump 112, solar collector 114, single-chamber reactor 116 having a cavity 118, bottom surface 120, one or more walls 122, bottom opening 124, top opening 126, wastewater inlet tube 128, treated water outlet tube 130, wastewater 132, treated water 134, electric board 136, voltage monitoring device 138, and electronic device 140). In addition, the system 200 includes plants 202 located on top of the sediment layer 104, with their roots 204 embedded in the sediment layer 104.

A conventional MFC is generally a two-chamber reactor system consisting of anode and cathode chambers separated by a proton exchange membrane (PEM). The general notion is that the system is only half biological in character because only the anode chamber contains the electrochemically active microorganisms, while the cathode chamber is abiotic in its functionality.

However, the systems and methods described herein use biocathodes wherein the combination of electrons, protons and oxidants could be catalyzed by a bacterial reaction (microbial reaction) instead of being catalyzed by platinum or equally expensive materials. This is a significant advantage and is an important feature of the systems and methods described herein regarding the construction of a MFC for electricity generation and simultaneous removal of contaminants. Also important is the concept that the MFC of this type similar to a PS-MFC in configuration can be employed in a variety of environmental applications ranging from wastewater treatment, water reclamation, storm-water run-off treatment and water purification directed at the removal of inorganic ions, toxic metals, and several organic contaminants and endocrine disrupting chemicals (EDCs).

Biocathodes are generally of two types, namely, the aerobic and the anaerobic. The aerobic type uses oxygen as the oxidant and the microbial population to assist or facilitate the oxidation of transition metal compounds exemplified by those of Mn(II) or Fe(II) for electron delivery to oxygen; and in turn these compounds are transformed to Mn(IV) or Fe(III) forms at higher oxidation states. The anaerobic type uses compounds such as sulfate, nitrate, manganese, selenate, arsenate, fumarate, urinate and carbon dioxide as electron acceptors.

The applications of MFCs as practical and alternative energy sources will increase if the power outputs are improved. The technology will benefit greatly from more efficient cell designs and superior electrode materials. Biological production of hydrogen using bacteria may be a potential pathway to generate higher power densities. However, limitations on process kinetics and rates of hydrogen generation may severely limit its applicability. However, as compared to photovoltaic systems, MFC systems generate an order of magnitude less power with the same surface area in operation. Nonetheless, MFCs may be designed to operate in the dark in the absence of sunlight, and more importantly, are capable of bio-remediating undesirable wastes with power generation. The ability of the MFC technology to harvest energy from industrial, municipal and food wastes creates a suitable niche for itself. The MFCs can operate efficiently under darkness without the requirement of sunlight as in photovoltaic systems. Furthermore, MFC systems can be employed for energy generation to sustain the operations of wastewater treatment, water reclamation and water purification systems. All these attributes make the MFC described herein a useful technology for the near future.

In natural water bodies, redox gradients are often spontaneously established across sediment-water interfaces, resulting in spatially segmented oxidation-reduction reactions. It must be noted that oxygen is generally present in water columns and sediment surface layers, and that oxygen reduction is the main reaction in the cathodic process. Nevertheless, in deeper sediments, anoxic environments develop, wherein organic matters or sulfides (in some cases) are oxidized by electron acceptors such as nitrate, phosphates, sulfates, and iron oxide or are via fermentation and methanogenic processes under the catalytic influence of indigenous and natural microbial population. Nonetheless, certain inherent problems exist in the case of PS-MFC applications for remediation purposes. Persistent organic pollutants may often be present that are not easily amenable to degradation owing to insufficiency in oxidative or reductive power. A second problem may surface due to uncontrolled fermentation and methanogenesis, leading to substantial production and release of methane as well as other product gases. A third problem can be attributed to lack of suitable electron donors or acceptors even if well-established mechanisms are known; and this factor is greatly amplified in the case of recalcitrant organic contaminants.

In the PS-MFC systems described herein, the roles of electrodes are important in controlling the overall process efficiencies. The role of the anode 102 is to efficiently draw electrons from microbial metabolic processes. The anode material should be resistant to biodegradation, biocompatible with the environment, mechanically or structurally stable, and economical in terms of cost and durability. Stainless steel and carbon-based materials are attractive candidates for this purpose. While stainless steel is a good conductor of electrons and is mechanically or structurally stable, it has low specific area and low corrosion resistance. In contrast, carbon-based materials have some relative advantages over stainless steel, although different carbon allotropes and carbon materials manifest considerable variations in electrochemical properties. Carbon based materials may include graphite plates, graphite rods, carbon fibers and carbon felts or fabrics, and several forms allotropic forms such as gas carbon and powdered graphite. Graphite plates may be used in MFC and PS-MFC designs to support consistent and sustained power generation. However, such materials are costly to produce and expensive to build, and further are difficult to be submerged in sediments. In comparison, graphite rods are easier to submerge into sediments, although they suffer from a relatively low surface area. As a compromise, graphite grids may be used in the upper layers of sediments to facilitate easy installation and to provide a protective barrier to release of hazardous chemicals. Nonetheless, electrode passivity and related problems may arise due to deposition of sulfur and other undesirable substances. Besides these problems, other complexities control material selection such as hydrostatic pressures in deep water zones and the protection of electrical circuits by water-proof coverings.

The selection of materials for the cathode 106 is also based on criteria similar to those employed for anodes 102. However, it is important to note that the cathodes 106 in the PS-MFC systems described herein are not subject to the same rigorous constraints as the anodes 102 are. Various carbon-based materials such as carbon/graphite fibers, mats or felts may be used as cathodes 106. Cathodic materials can be much larger in size and lower in strength than anodic materials. However, in the case of cathodic materials, overall durability and mechanical properties are more important considerations. Carbon materials of a brittle nature may be unsuitable for using in cathodes 106, and open-structured materials are preferred for increasing oxygen access. Under the circumstances, soft carbon materials in combination with tough metal frames, such as stainless steel, are attractive options. Unlike the case of anodic design, stainless steel can be better protected from corrosion in cathodes.

A noteworthy feature in cathodic design is that although carbon materials used alone or in combination with stainless steel can catalyze the oxygen reduction reaction, the power generation efficiency is typically very low. Therefore, chemical catalysts may be loaded on the cathode substrate to increase the kinetics of the oxygen reduction reaction. Such catalytic materials may include platinum and others that are prohibitively expensive. Besides their costs, they have limited life-spans owing to their inevitable vulnerability to catalytic fouling and poisoning. In view of these problems, a carbon felt cathode coated with carbon-based materials such as granular activated carbon, powder activated carbon and nano-materials such as graphene derivatives exemplified by graphene and graphene oxide may be used. Experiments with these cathodes showed that the PS-MFC system perform with better consistency, yield higher power generation, and yield higher contaminant destruction. The design of the specific electrode to avoid problems relating to cost and durability besides operational efficiency is not obvious and is a specialty of the systems and methods described herein.

The S-MFC and/or PS-MFC reactors described herein are designed and engineered using novel configurations for effective removal of organic contaminants, improving nutrient removal, and optimizing systems operations. These simple bio-electrochemical systems (illustrated in FIGS. 1 and 2) can continuously generate electricity without significant demand for maintenance. Some embodiments may include any combination of the following:

1. They employ a single-cell MFC system which uses wetland sediment in both anode and cathode zones.
2. They use graphite fiber felt electrodes with coating of activated carbon and graphene oxide.
3. They incorporate emerging aquatic plants including Typha minima (dwarf cattail) and Phalaris arundenacea (reed canary grass) in the cathode zone. The plant roots serve two functions: (i) they secrete (or generates) dissolved oxygen (electron acceptor), and (ii) they increase the microbial density.
4. They use particular electrodes. The uniqueness of the carbon-based electrodes is that they are specially designed for enhancing the process efficiency and obviating the problems of high costs and fouling or poisoning.
5. They use a solar collector to run air pumps to aerate cathode electrode zone.
6. They may be used for treating wastewaters that contain high levels of organic matter such as: dairy farms; cattle feed lots; food processing wastes (pickling, precooking); fruits and vegetables processing; sugar production; poultry and meat processing; pulp and paper mills; petrochemicals, etc.
7. They provide partial aeration using self-generated energy.
8. They are capable of scalability to pilotscale and fullscale operations (see "design considerations" section).
9. A major aspect is the electricity generation in terms of voltage, current, and power density.

10. The COD removal is almost complete and approaches 100% in the system.
11. The nitrate removal is about 40% in the system.
12. The sulfate removal is 35 to 40%.
13. The phosphate removal is almost complete and is close to 100% in the system.
14. The chloride reduction is about 15%.

Figure 3:
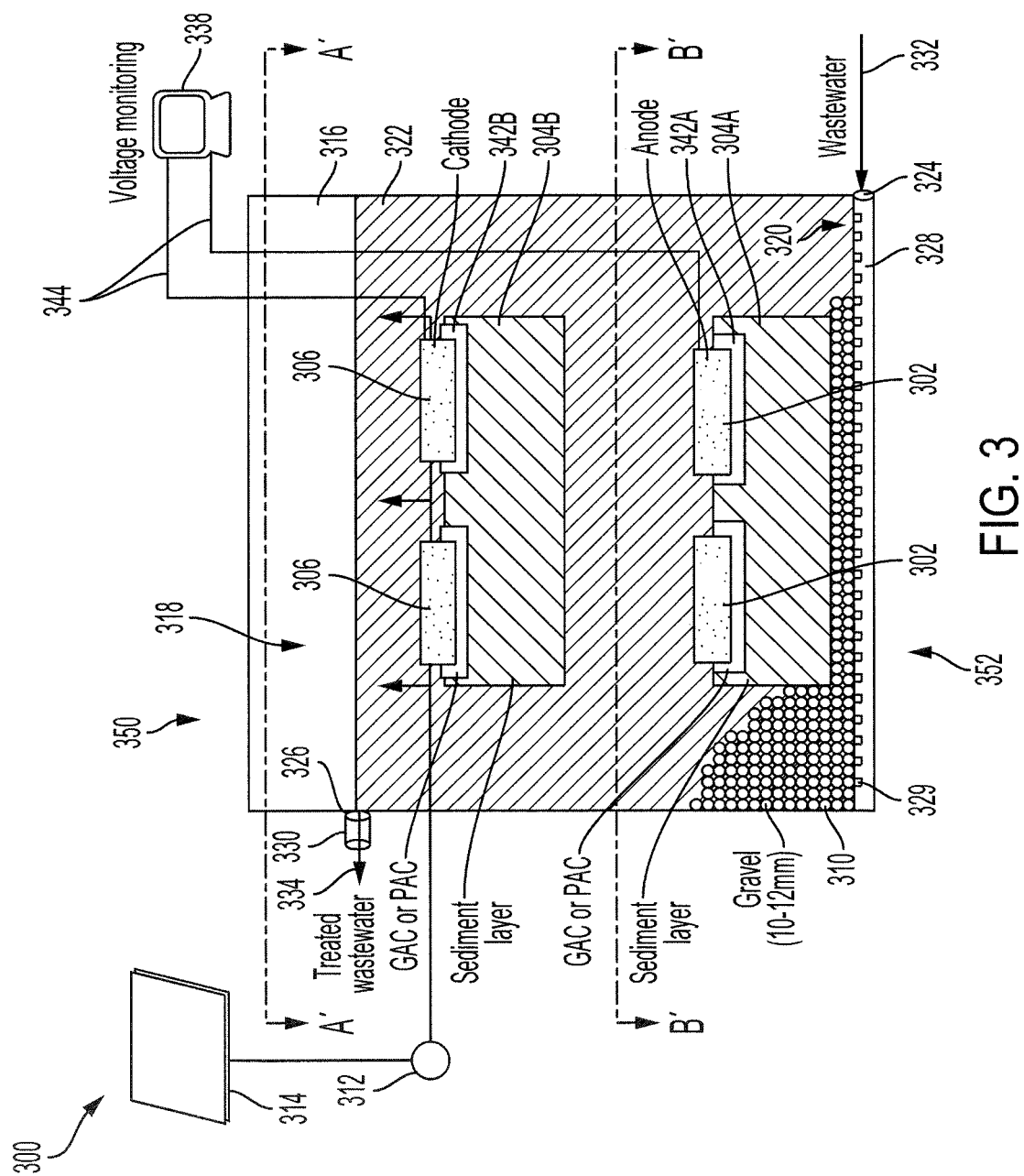
FIG. 3 illustrates a side view of a plant sediment microbial fuel cell system with four pairs of electrodes, according to various embodiments of the invention.
Figure 4:
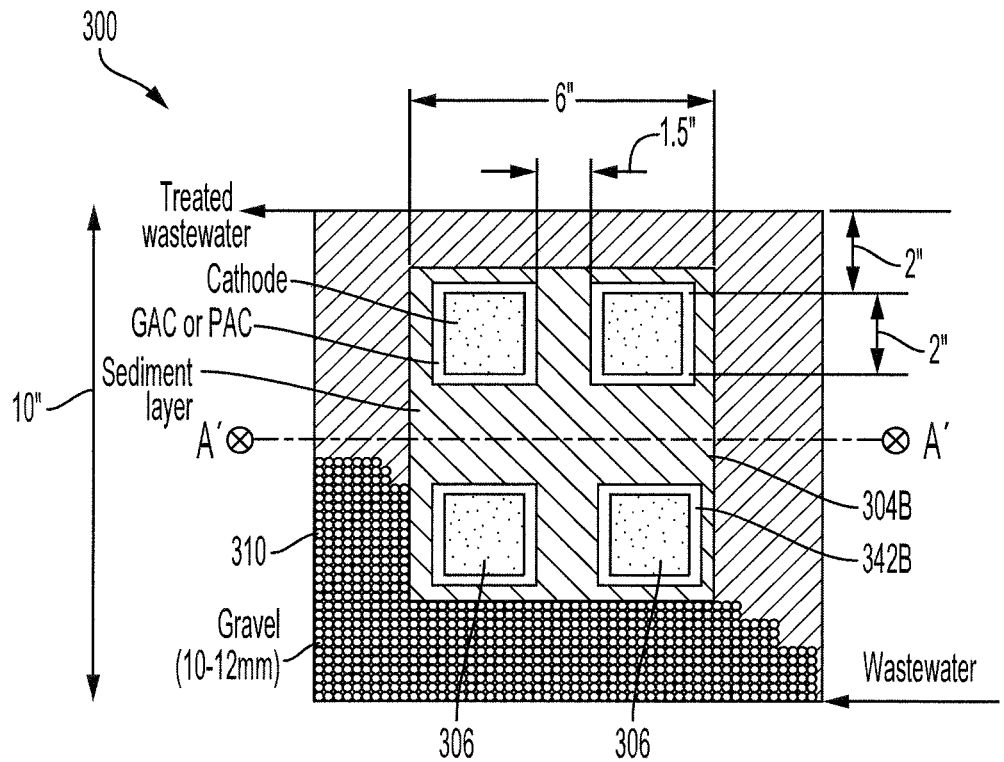
FIG. 4 illustrates a top-down view of a plant sediment microbial fuel cell system, according to various embodiments of the invention.
Figure 5:
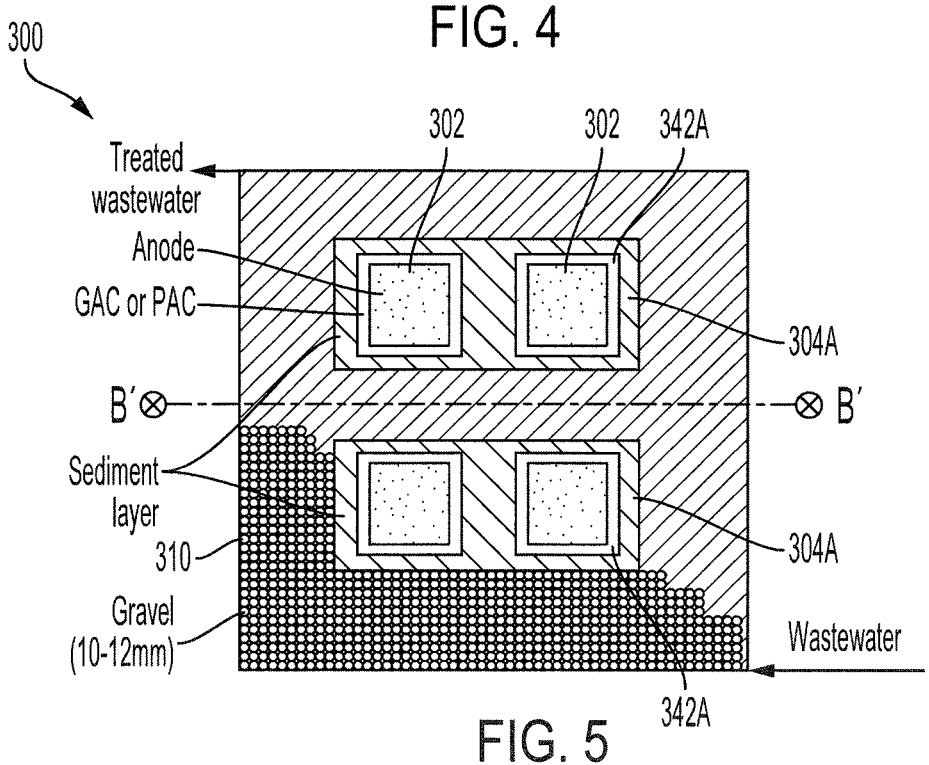
FIG. 5 illustrates a midpoint-down view of a plant sediment microbial fuel cell system, according to various embodiments of the invention.

FIGS. 3-5 illustrate an example PS-MFC system 300 similar to systems 100 and 200. FIG. 3 is a side view of the system 300. FIG. 4 illustrates a top-down view from line A' shown in FIG. 3. FIG. 5 illustrates a top-down view from line B' shown in FIG. 3. The PS-MFC system 300 can be employed for the treatment of wastewaters and industrial waters or groundwaters for a variety of environmental applications including water reclamation and reuse, and at the same time generating electric power for the sustenance of the treatment operations and the electronic control systems.

The system 300 includes a single-chamber reactor 316 having one or more side walls 322 defining a cavity 318. The single-chamber reactor 316 also has a top end 350 and a bottom end 352. In some embodiments, the single-chamber reactor 316 is 10 inches by 10 inches by 10 inches and made of acrylic Plexiglass that is 0.25 inches thick. In other embodiments, the single-chamber reactor 316 is rectangular, cylindrical, or any other shape, and made of a durable non-conductive material.

A bottom opening 324 is located near a bottom surface 320 of the single-chamber reactor 316, and the bottom opening 324 is connected to a wastewater inlet tube 328 which is configured to supply wastewater 332 to the single-chamber reactor 316. In some embodiments, the wastewater inlet tube 328 is located along the bottom surface 320 of the single-chamber reactor 316 and evenly provides wastewater 332 to the single-chamber reactor 316 via a plurality of openings 329 along the wastewater inlet tube 328. In some embodiments, there are multiple wastewater inlet tubes 328 (e.g., three tubes) that branch from the bottom opening 324 to provide a more evenly distributed delivery of wastewater 332 to the single-chamber reactor 316.

A first layer of gravel 310 is located on the bottom surface 320 of the single-chamber reactor 316 and above the wastewater inlet tube 328. In some embodiments, the first layer of gravel 310 is 2 inches thick and the gravel is 10-12 mm in diameter.

A first layer of sediment 304A is located on top of the first layer of gravel 310. The first layer of gravel 310 acts as support for the first layer of sediment 304A. In some embodiments, the first layer of sediment 304A is divided into four patches corresponding to each anode 302. In some embodiments, the first layer of sediment 304A is divided into two patches with each patch supporting two anodes 302. In some embodiments, the first layer of sediment 304A is a single patch supporting all anodes 302. In some embodiments, when the first layer of sediment 304A is divided into four patches, each patch is 2.5 inches by 2.5 inches and has a thickness of 2 inches.

A first layer of granular activated carbon granular activated carbon or granular activated carbon with graphene oxide or sand with graphene oxide 342A is located on top of the first layer of sediment 304A. The first layer of granular activated carbon or granular activated carbon with graphene oxide or sand with graphene oxide 342A enhances electron transfer, current generation rate, and wastewater treatment. In some embodiments, the first layer of granular activated carbon and graphene oxide is ⅜ inch thick and has a 20-30 US mesh size.

An anode 302 is located on top of the first layer of granular activated carbon or granular activated carbon with graphene oxide or sand with graphene oxide 342A. In some embodiments, the anode 302 is made of graphite fiber felt. In some embodiments, the anodes 302 are 2 inches wide, 2 inches long, and ¼ inch thick. The top-down view B' of the bottom half of the system 300 is shown in FIG. 5.

A second layer of gravel 310 is located on top of the anodes 302. FIG. 3 does not illustrate the gravel 310 covering the anodes 302 for illustrative clarity purposes, but a second layer of gravel 310 is present above the anodes 302. In some embodiments, the second layer of gravel 310 is 3 inches thick.

A second layer of sediment 304B is located on top of the second layer of gravel 310. The second layer of gravel 310 acts as support for the second layer of sediment 304B. In some embodiments, the second layer of sediment 304B is divided into four patches corresponding to each cathode 306. In some embodiments, the second layer of sediment 304B is divided into two patches with each patch supporting two cathodes 306. In some embodiments, the second layer of sediment 304B is a single patch supporting all cathodes 306. In some embodiments, when the second layer of sediment 304B is divided into four patches, each patch is 2.5 inches by 2.5 inches and has a thickness of 2 inches.

A second layer of granular activated carbon granular activated carbon or granular activated carbon with graphene oxide or sand with graphene oxide 342B is located on top of the second layer of sediment 304B. The second layer of granular activated carbon or granular activated carbon with graphene oxide or sand with graphene oxide 342B enhances electron transfer, current generation rate, and wastewater treatment. In some embodiments, the second layer of granular activated carbon and graphene oxide is ⅜ inch thick and has a 20-30 US mesh size.

A cathode 306 is located on top of the second layer of granular activated carbon or granular activated carbon with graphene oxide or sand with graphene oxide 342B. In some embodiments, the cathode 306 is made of graphite fiber felt. In some embodiments, the cathodes 306 are 2 inches wide, 2 inches long, and ¼ inch thick and separated from each other by 1.5 inches. The top-down view A' of the top of the system 300 is shown in FIG. 4.

Wires or cables 344 connect the anodes 302 and the cathodes 306 to a device 338, such as a voltage monitoring device or a battery. The single-chamber reactor 316 includes a top opening 326 which is connected to a treated water outlet tube 330, which emits treated water 334.

The system 300 includes four electrodes (anodes 302 and cathodes 306) as illustrated in FIGS. 3-5. The MFC includes a single-chamber reactor 316 and does not employ a proton exchange membrane (PEM) to separate the anode and cathode chambers, a factor that would increase the overall operational and maintenance cost. Thus, the systems 300 is cheaper to construct and maintain than an MFC with a PEM. The novel design of PS-MFC reactor configuration and design features of the system 300 play an important role in increasing the process efficiency. In particular, the four sets of electrodes (anodes 302 as well as cathodes 306) may be strategically placed so that the liquid flow is uniformly distributed within the single-chamber reactor 316 reaching all sides of sediment beds 304. A set of air diffusers 312 may be placed in the upper region of the single-chamber reactor 316 with appropriate spatial distribution around the cathode electrodes for uniform distribution of air bubbles. These features improve the energy production and performance of the MFC system 300 and enhance its sustainability and durability of operation. In fact, these features enhance the mass-transfer associated with the biochemical reactions and photosynthetic reactions and substantially contribute to increased levels of contaminant treatment and power generation. The air diffusers 312 may be powered by solar panels 314.

The application of carbon-based electrodes (both anodes 302 and cathodes 306) has important novelty in the overall process design. The electrodes are enclosed in media comprising granular activated carbon (GAC) coated with graphene oxide nanosheets (GAC-GO) or sand coated with graphene oxide nanoparticles (Sand-GO) 342 that are embedded in the sediment layers 304. These design features increase electron transfer and the rate of current generation and contaminant treatment. The different types of electrodes used in the PS-MFC system such as those with GAC, GAC-GO and sand-GO yielded almost similar results in terms of power voltage production and contaminant removals.

The PS-MFC system 300 may also employ a solar panel (e.g., solar panel 314 or a second solar panel) connected to a battery (e.g., device 338) for storing the electricity generated by the microbial cell reactions and the photosynthetic reactions of the sediment plants (e.g., plants 202). The photosynthetic activity of plant roots providing the enzymes and nutrients for microbial biochemical activity. The electricity generated by the system and stored in the battery may provide the power for the fluid and aeration pumps used for sustained operation of the PS-MFC system 300. The overall design of the system 300 facilitate the continuous and efficient operation of the process under both diurnal and nocturnal conditions.

Experimental Results

In experiments using a system similar to system 300, the output voltage data was periodically recorded with a data acquisition computer and archived. The voltage values corresponding to the change in external resistance from high to low were recorded, and the corresponding current values were calculated using the following relation:

$$I = U/R \quad (1)$$

where, I is the output current (A), U is the output voltage (V) and R is the external resistance (ohms). Plotting the voltage values versus the current values yielded the polarization curve. The fitted ohmic polarization region of the polarization curve typically showed a linear relationship, the slope of which was the apparent internal resistance.

A saturated calomel electrode was inserted into the cathode chamber as a reference electrode to measure cathode potential. The anode potential was calculated as the cell voltage minus the measured cathode potential. The output power of the cell was calculated using the relation:

$$P = U^2/R \quad (2)$$

where, P is the output power (Watts). The power density of the cell was calculated based on the area of the cation exchange membrane. Plotting the power density values versus the current value will yielded the power-density curve. Generally, the highest point of such a curve is the maximum power density of the cell. The soluble chemical oxygen demands (COD) of the PS-MFCs were measured according to the standard method.

The Coulombic efficiency is the ratio between the number of output electrons and the number of electrons that the consumed organic compounds can provide. It describes the energy transfer efficiency of an MFC, and is an important indicator of MFC electricity generation performance. For the present experiments, the coulombic efficiency was calculated as follows:

$$CE = 8Q\ FVCOD \quad (3)$$

where CE is the coulombic efficiency (%), Q is the total output of the PS-MFC during a cycle (C), F is he Faraday constant (96485C/mol), V is the volume of anode solution (mL), COD is the change in the COD concentration during a cycle (mg/L) and the constant "8" is used when oxygen is the electron acceptor.

In the experiments, 16S rDNA libraries were developed from the environmental samples of relevance to characterize the microbial or more specifically the bacterial population. A distinct feature was the examination of the changes undergone by the microbial population during the entire phase of operation of the PS-MFC reactor systems. The microbial population in the sediments used to initiate the reactor operation was characterized, and subsequently the population in the reactor after several days of successful operation, the population was re-characterized. Several aspects may be related to the cause for changes in microbial populations and their distributions. Fluxes in the influent nutrient composition might lead to shifts in microbial metabolisms linked to adaptive changes in the bacterial community—an important aspect discussed by Freeman et al. (1990). Apart from this aspect, the functional responses of microbial communities could influence substantial changes in the population and the microbial taxa.

In order to examine and characterize the bacterial community and its composition, the microbial genomic DNA were extracted, and the DNA concentrations and purity were determined by gel electrophoresis as well as by spectrometry using electromagnetic radiations in the wavelength range of 260 to 280 nm. In this procedure, a total of 80 ng was used as template DNA for subsequent polymerase chain reactions (PCR). The PCR amplification of the 16s rDNA of the bacterial population was accomplished with PCR primers designed to correspond with certain conserved and significant regions of the 16s rDNA gene. It is important to note that these primers were previously demonstrated to amplify approximately the 325 pp section of the 16s rDNA gene, a segment generally recognized as highly variable across the bacterial taxa. In the protocol and techniques employed, both forward and reverse primers were selected to amplify a segment of the 16s rDNA flanked at positions 519-536 and 907-926 of the *Escherichia coli* genome, respectively. The forward and reverse primers respectively corresponded to the following proteomic specifications—Com1-F: 5'-CAGCAGCCGCGCTAATAC-3' (SEQ ID NO: 1) and Com1-R: 5'-CCGTCAATTCCTTTGAGTT-3' (SEQ ID NO: 2). The PCR amplifications were carried out in an NJ-PTC-111 thermal recycler.

The reaction mixtures prepared of the following components: 1×PCR buffer, 2 mM magnesium chloride ($MgCl_2$), 2.0 units of Taq polymerase, and 0.5 mM of each primer. The reaction profile can be summarized by the following steps: initial denaturing at 94° C. for 3 min, followed by 35 cycles of 60s at 94° C., 60s at 50° C., and 90s at 74° C. for 4 min, and subsequently 4 min at 4° C. In order to control the potential bias during PCR amplification, two independent replicates were separately employed for PCR and subsequent cloning of 16s rDNA libraries. The PCR amplifications were cloned using standard TOP cloning kits with a 2.1 PCR cloning vector according to conventional protocol. The sequencing reactions were performed using the capillary DNA sequencing technology and associated fluorescence chemical reactions. Electrograms from DNA sequences were obtained and checked for accuracy.

In order to obtain the taxonomic characterization of the 16s rDNA sequences, the rank abundances of these sequences were obtained for the bacteria community. This methodology involved the application of the open-source sequence classifier of the Ribosomal Database Project (RDP), and the implementation of the Basic Local Alignment Search Tool (BLAST) protocol. The RDP classifier placed the DNA sequences in the major and formal taxonomic hierarchical ranks of domain, phylum, class, order, family, genus and species with estimates of confidence levels. After obtaining the bacterial categorization by the RDP classifier and the BLAST queries, phylogenetic analyses were performed for confirming the microbial classifications.

The configurations of the PS-MFC reactor systems without plants and with plants is shown in FIGS. 1 and 2. Comparisons and evaluations of the activities of microorganisms in the presence and absence of plant sediments regarding contaminant removals and electricity generation may be compared across the two systems. Nevertheless, caution must be exercised in these comparisons because a number of variables are involved that affect the overall process efficiencies, and further, the systems must be optimized further to improve significantly their performance levels. The two systems were operated continuously for long durations of over 12 to 30 days (288 to 720 hours) to obtain consistent data regarding power outputs and contaminant removals after the microbial populations were sufficiently acclimation with the substrates and nutrients. More important was the consideration whether the systems would maintain steady and dependable performances from the standpoint of reliability and sustainability for long-term operations and potential scalability for realistic pilot-scale demonstrations and full-scale applications.

Figure 6A:
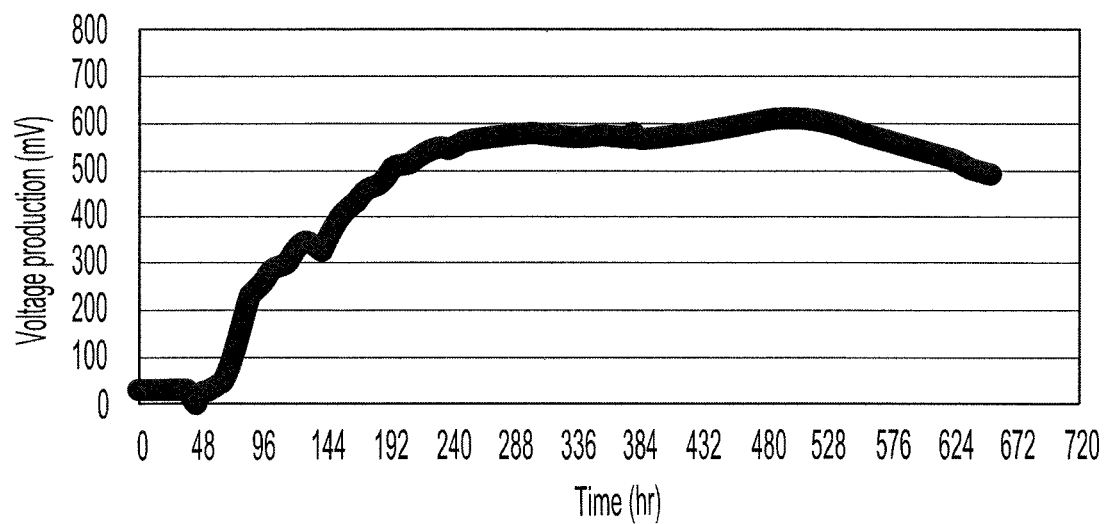
FIGS. 6A and 6B illustrate the voltages yielded by the plant sediment microbial fuel cell system without plants and with plants, according to various embodiments of the invention.
Figure 6B:
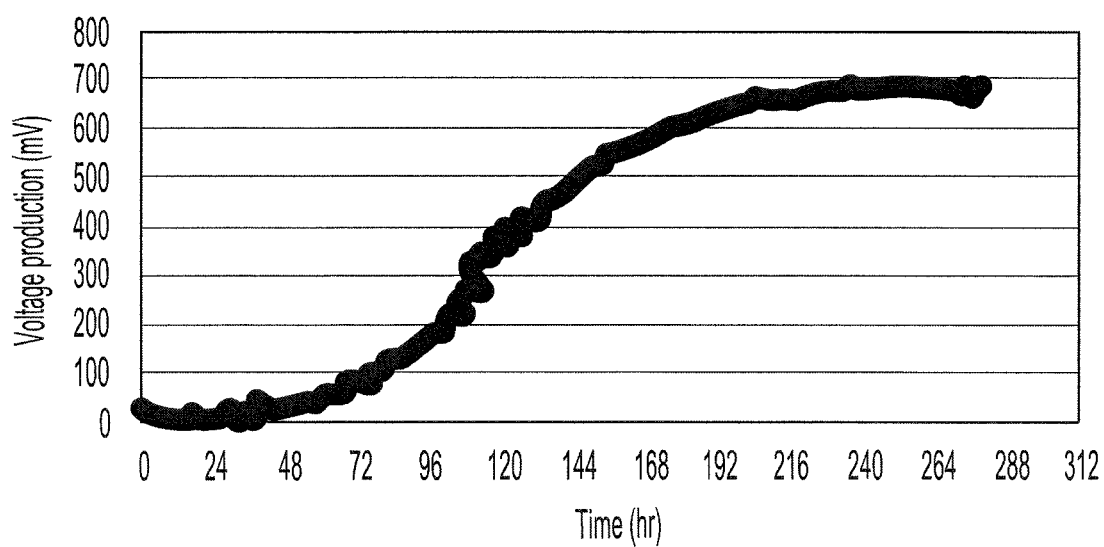

FIGS. 6A and 6B present the typical voltages yielded by the PS-MFC system without plants and with plants, respectively. A comparison of the voltage data indicates that both reactor operations require some operation time for attaining an optimal power generation. It can be observed that the maximum voltage obtainable without plants is 600 mV, while the corresponding voltage with plants nearly 700 mV. These data reflect the efficacy of using plants to improve the voltage levels. Another important aspect for consideration is the system acclimation or adjustment time required for optimal power generation as reflected by the cell voltage. The patterns of system adjustment towards optimal performance is similar in both cases as reflected in FIG. 2. The stabilization times for the cases without plants and with plants exhibit qualitative similarity (a duration of about 200-240 hours), although the application of plants enhances the overall performance of voltage generation by about 15-17 percent. These results highlight the fact that the use of plants is important in enhancing the power generation capability of the MFC and a general indication is that the plant exudates enhance the overall performance of the microbial activity.

Contaminant removal is an equally important aspect besides power generation and energy sustainability in the operation of the PS-MFC systems. This is an important consideration in applications related water reclamation and reuse, or for that matter municipal or industrial wastewater treatment, and storm-water treatment. The contaminants considered include organics and some inorganics represented by a surrogate parameter such as COD. Other contaminants include specific inorganic ions such phosphate, as nitrate, sulfate and chloride.

Figure 7A:
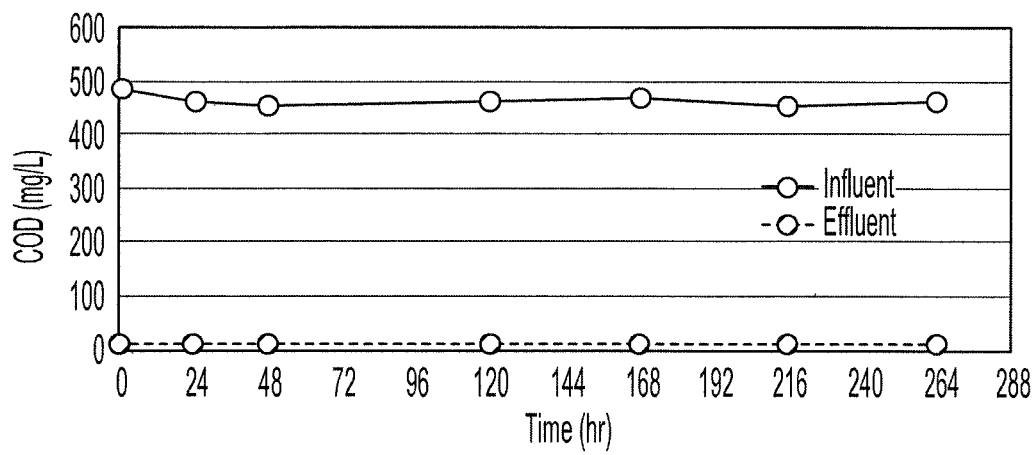
FIGS. 7A and 7B present the chemical oxygen demand removals in the plant sediment microbial fuel cell systems with and without plants, according to various embodiments of the invention.
Figure 7B:
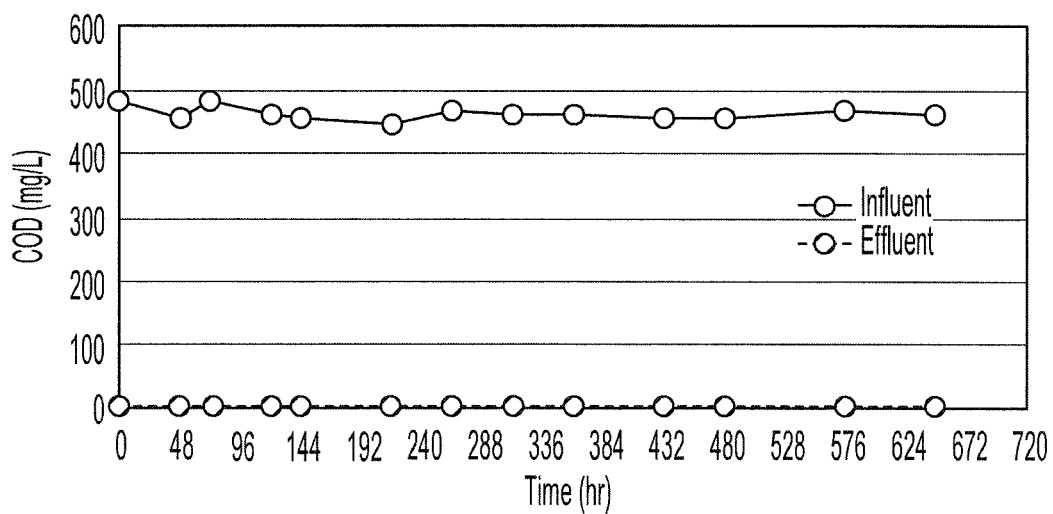

FIGS. 7A and 7B present the COD removals in the MFC systems in the presence and absence of the plants. FIGS. 7A and 7B show the influent COD concentrations (blue) and the effluent COD concentrations (red) during the system operation. In both systems, the influent COD levels were consistently maintained at an average level of 470-500 mg/L. The experimental data clearly indicate that the MFC does not exhibit an induction period regarding COD removal. The residual COD levels are in the range of nearly 0-5 mg/L, reflecting about 99 percent to nearly complete removals.

Figure 8A:
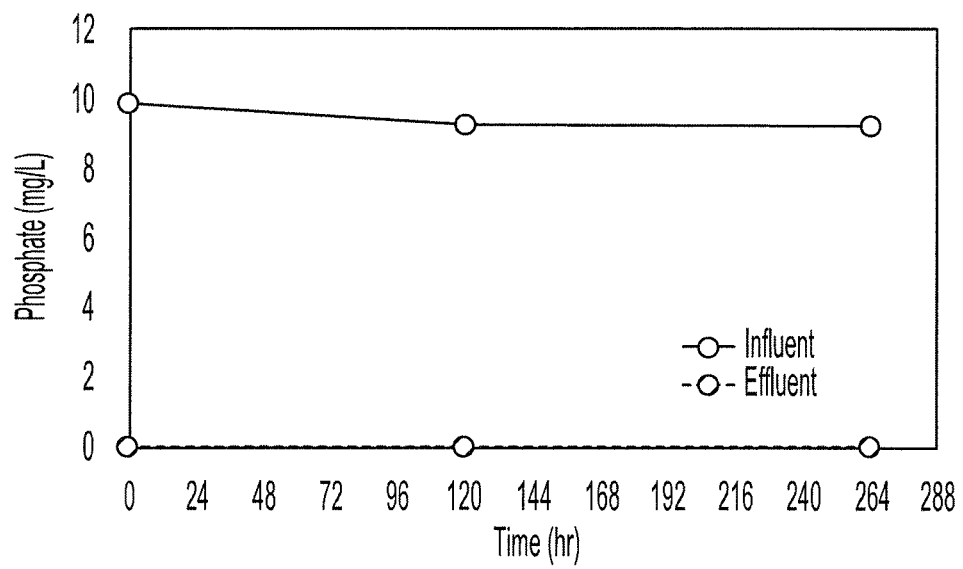
FIGS. 8A and 8B show the removal of phosphate ions in the plant sediment microbial fuel cell systems with and without plants, according to various embodiments of the invention.
Figure 8B:
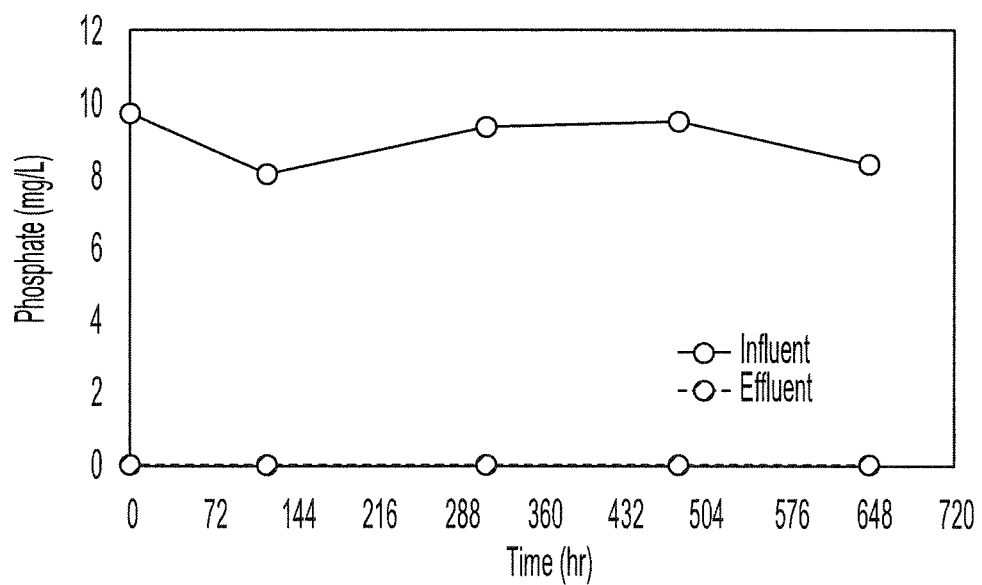

FIGS. 8A and 8B show the removals of phosphate ions in the MFC systems in the presence and absence of plants. The results presented in FIGS. 8A and 8B show nearly complete removals of phosphate in both reactor systems, and the trends are almost similar to those observed for COD removals. It must be noted that the average influent phosphate levels to the reactor systems are on an average 9-10 mg/L. The results indicate that phosphate is completely removed from the beginning of the operation in both systems. The experiments show that the microbial activity with or without plants is sufficient for achieving almost complete phosphate removals. The complete removals of COD and phosphate indicate the high levels of microbial activity in these systems. It can be concluded that the biological reactions are very efficient in so far as consuming phosphate and organic compounds. The complete removals of COD illustrate that almost total mineralization of organic contaminants occurs in the MFC systems, and not decomposition of high molecular weight organic compounds into lower molecular weight ones.

Figure 9A:
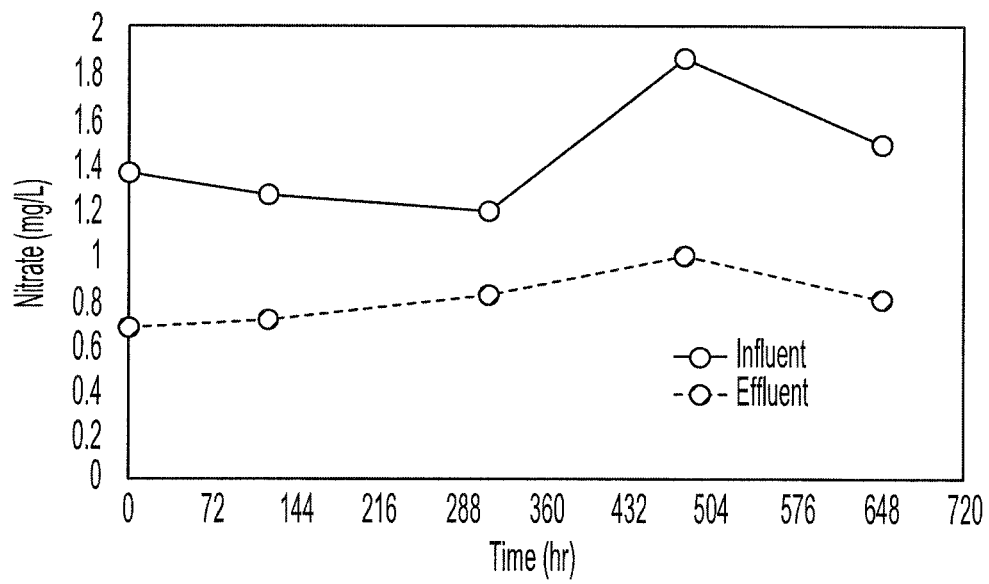
FIGS. 9A and 9B show the removal of nitrate ions in the plant sediment microbial fuel cell systems with and without plants, according to various embodiments of the invention.
Figure 9B:
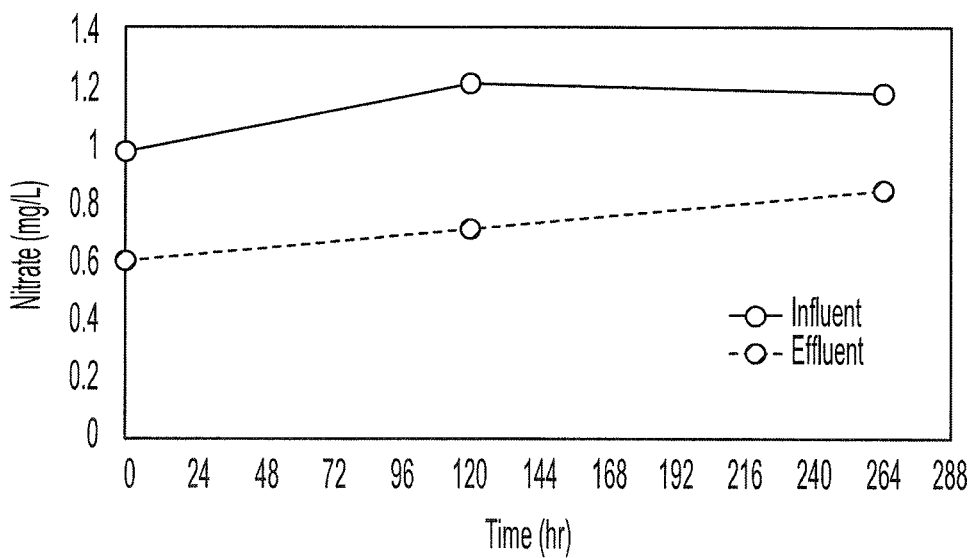

FIGS. 9A and 9B show the removal of nitrate ions in the MFC systems in the presence and absence of plants. The results presented in FIGS. 9A and 9B indicate that the removals of nitrate in both reactor systems show similar patters with influent concentrations spanning a range of 1-1.8 mg/L. The removals vary from 55 to 57 percent. These results reflect fairly good nitrate removals even at low influent concentrations. The results support the view that the process is effective in achieving significant nitrate removals for agricultural and groundwater runoff treatment uses. The extent of nitrate treatment can be further enhanced by process optimization.

Figure 10A:
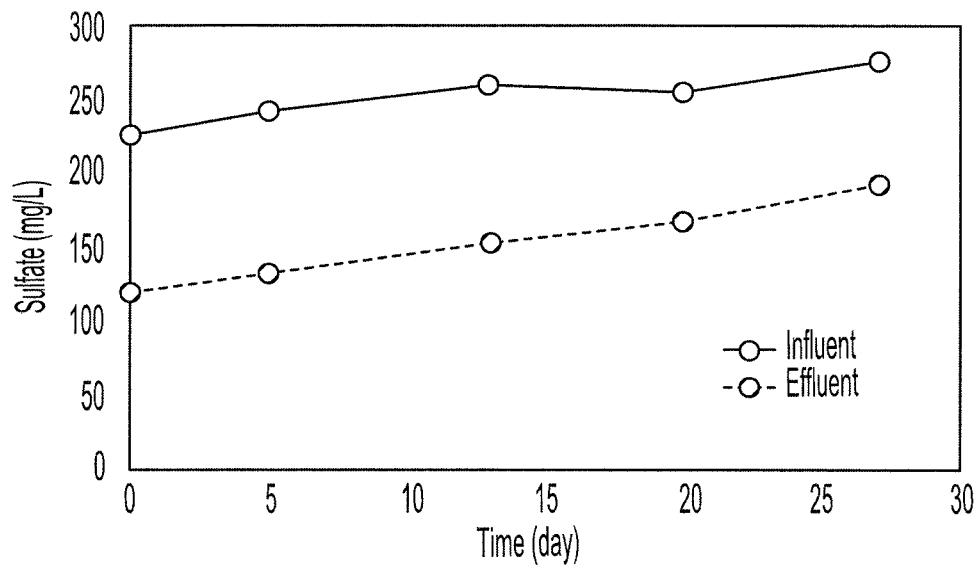
FIGS. 10A and 10B present the removal of sulfate ions in the plant sediment microbial fuel cell systems with and without plants, according to various embodiments of the invention.
Figure 10B:
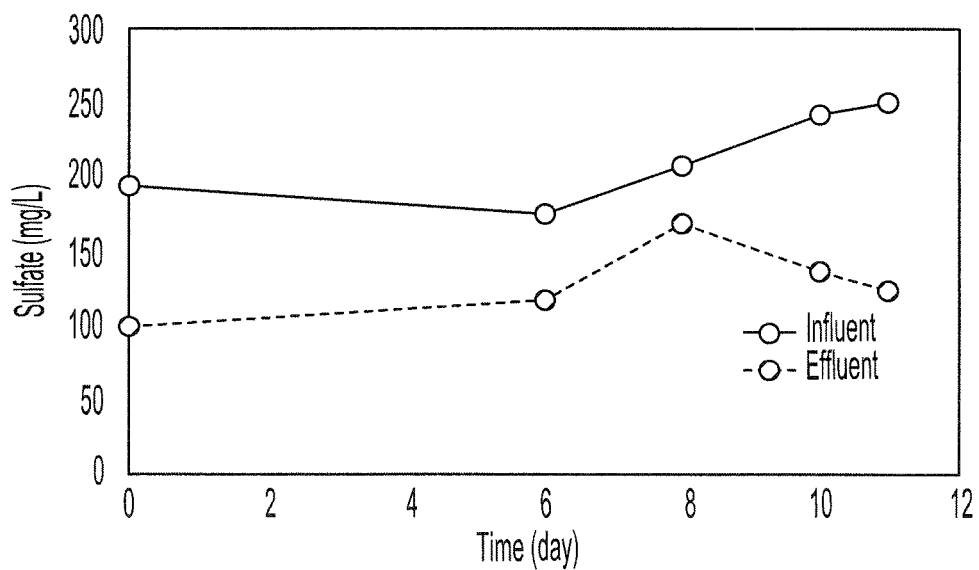

FIGS. 10A and 10B present the removal of sulfate ions in the MFC systems in the presence and absence of plants. The results presented in FIGS. 10A and 10B show partial removals of sulfate in both reactor systems to the extent of 45-50 percent corresponding to influent concentrations of 200-280 mg/L. The removals of sulfate may be substantially improved by process optimization and the process may be employed for handling high sulfate levels as well.

Figure 11A:
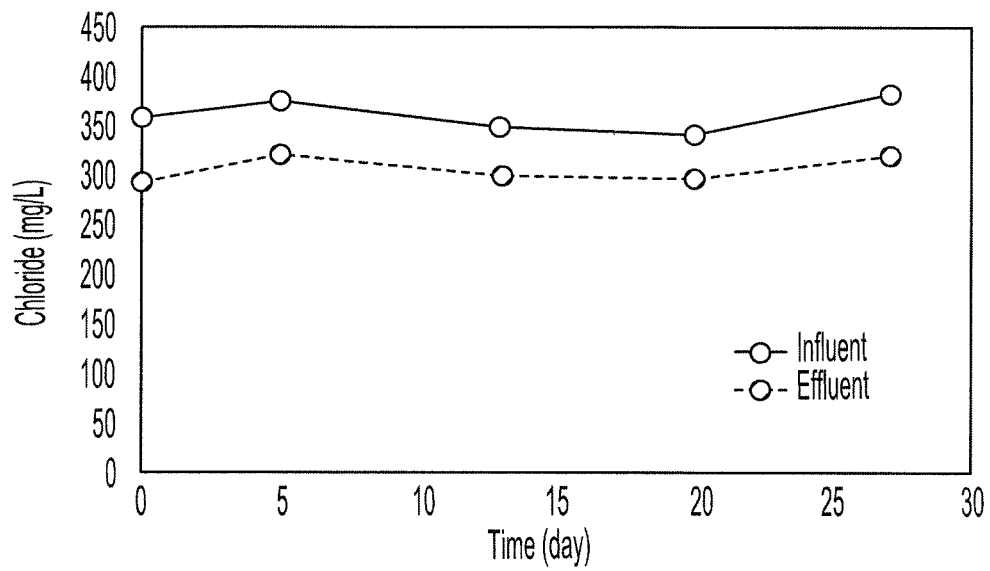
FIGS. 11A and 11B present the removal of chloride ions in the plant sediment microbial fuel cell systems with and without plants, according to various embodiments of the invention.
Figure 11B:
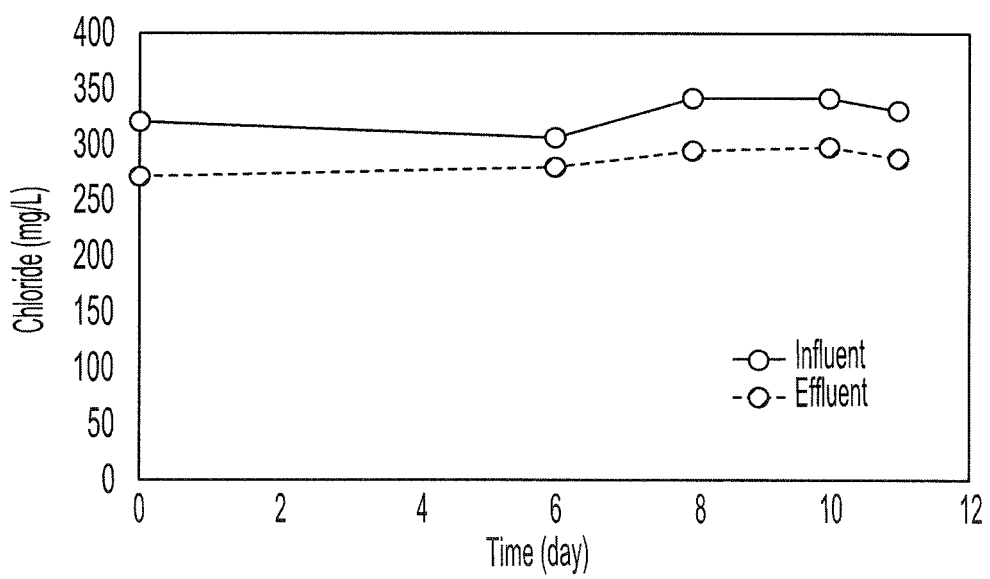

FIGS. 11A and 11B show the removal of chloride ions in the MFC systems in the presence and absence of plants. The results presented in FIGS. 11A and 11B show partial removals of chloride in both reactor systems to the extent of about 20 percent at influent concentrations of 300-350 mg/L. These removals can be enhanced further by process optimization and modification of the microbial population and tailored for different applications.

One of the major factors influencing the dynamics and efficiency of the PS-MFC reactor system is the qualitative nature of the microbial strains of microorganisms and their relative abundance. The microbial population in the sediments used for activating the MFC was studied and a PCR-DGGE analysis was conducted. The identified bacterial strains in the sediments employed at the commencement of the MFC experiments included the following strains at these relative abundance levels: Dechloromomonas, 3.87%; Thiocapsa, 5.36%; Ecothiorhodospira, 6.48%; Other strains, 58.2%; and Unclassified strains; 29.06%.

The complete results of the microorganisms present in the sediment used in the PS-MFC described herein are presented in FIGS. 12A-12E. FIG. 12A illustrates the microorganisms present in the sediment by class. FIG. 12B illustrates the microorganisms present in the sediment by order. FIG. 12C illustrates the microorganisms present in the sediment by family. FIG. 12D illustrates the microorganisms present in the sediment by genus. FIG. 12E illustrates the microorganisms present in the sediment by species. The reactors were operated for several days and the microbial population in the reactors were analyzed. A noteworthy observation was that only Geobacter strains were identified after the PS-MFC systems were operated for several days, and no other strains were identifiable. These observations indicated that the Geobacter strains were the best survivors in the reactor systems as all other strains were gradually reduced and eliminated over time. They also seemed to imply that the Geobacter strains were the most robust strains that could survive in the environment after metabolizing the wastewater and simultaneously generate electricity. It is highly possible that by a process of natural selection, the Geobacter strains fortified themselves as highly electrogenic species in the present microbial environment.

Figure 13:
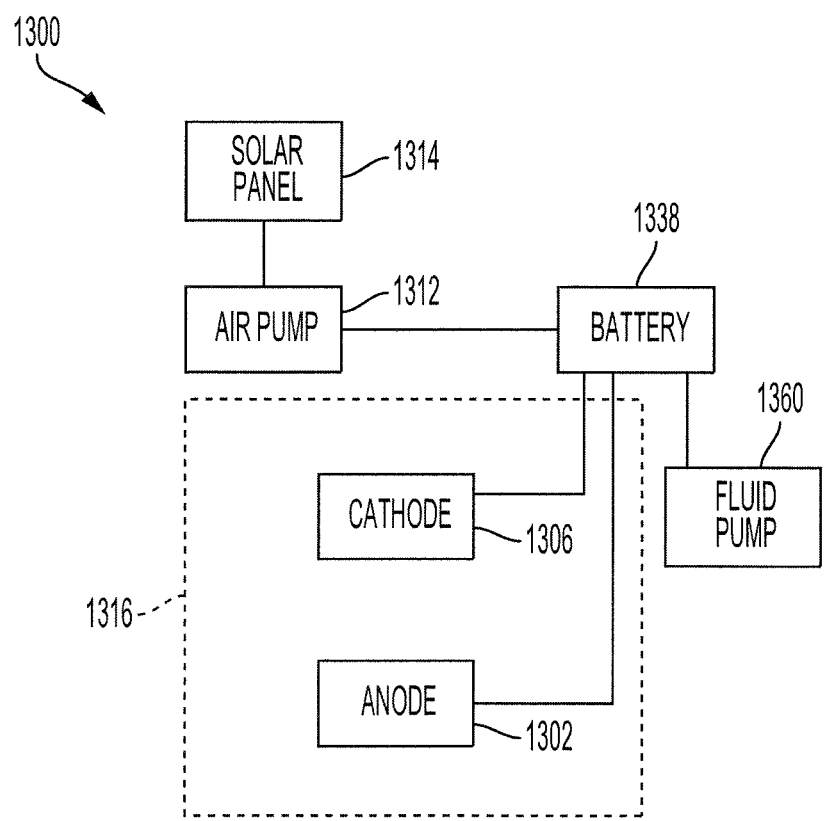
FIG. 13 illustrates a block diagram of a plant sediment microbial fuel cell system, according to various embodiments of the invention.

FIG. 13 illustrates a block diagram of a system 1300 similar to systems 100, 200, and 300. The system 1300 includes a single-chamber reactor 1316 similar to single-chamber reactors 116 and 316. The system 1300 also includes one or more anodes 1302 similar to anodes 102 and 302. The system 1300 also includes one or more cathodes 1306 similar to cathodes 106 and 306. The one or more anodes 1302 and the one or more cathodes 1306 are located inside of the single-chamber reactor 1316 and are connected to a battery 1338.

The battery 1338 stores electricity generated by the one or more anodes 1302 and the one or more cathodes 1306 and powers an air pump 1312 similar to air pump 112 and 312 as well as a fluid pump 1360. The fluid pump 1360 is configured to move fluids (e.g., wastewater 132, 332 and treated water 134, 334) through the single-chamber reactor 1316.

The air pump 1312 and/or the fluid pump 1360 may also be powered by a solar panel 1314 similar to solar panels 114 and 314. The solar panel 1314 may also store electrical power in the battery 1338. The system 1300 treats wastewater and generates electricity, similar to systems 100, 200, and 300, as described herein.

Figure 14A:
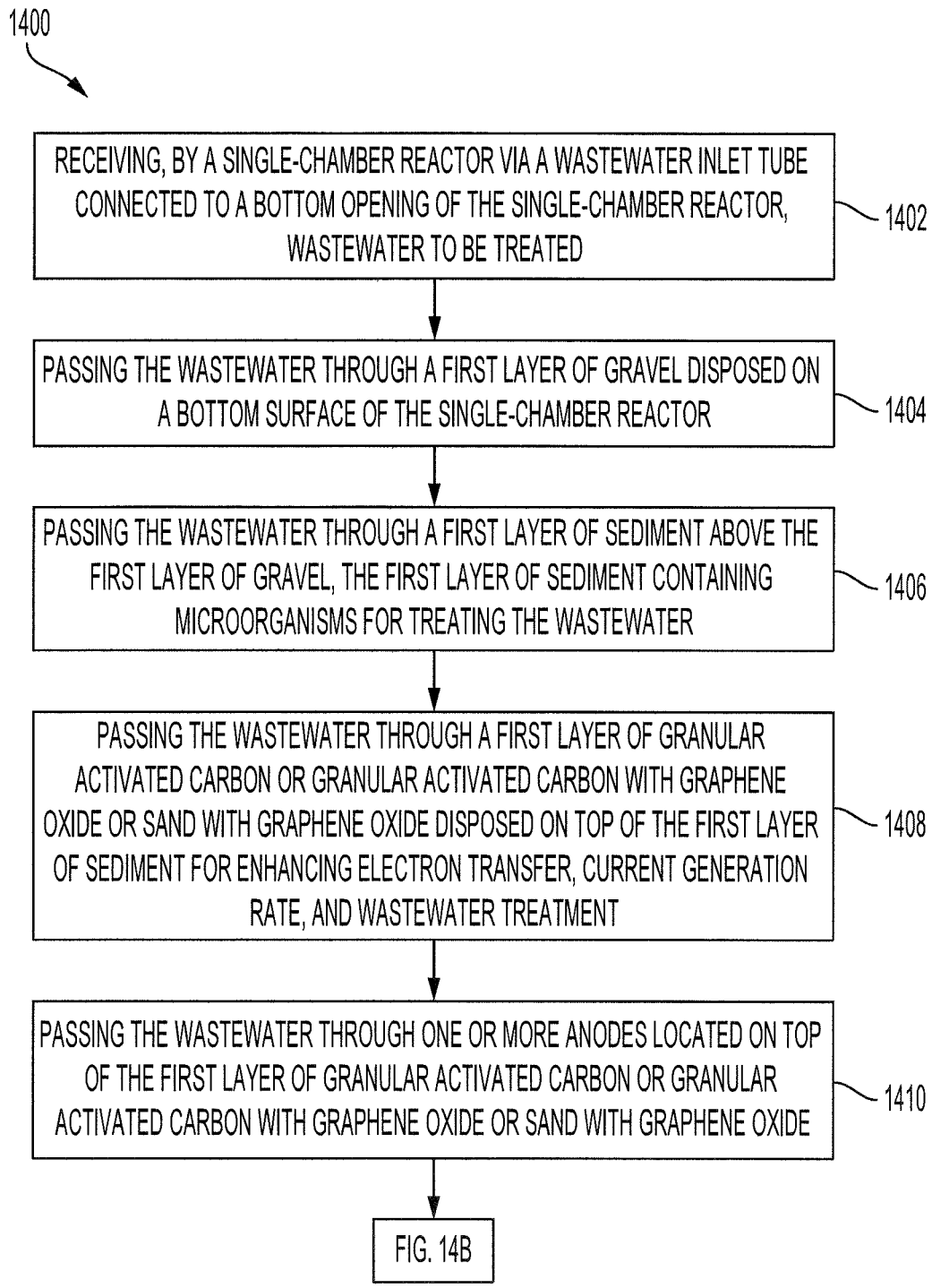
FIGS. 14A-14C illustrate a flowchart of a process for treating wastewater and generating electricity, according to various embodiments of the invention.
Figure 14B:
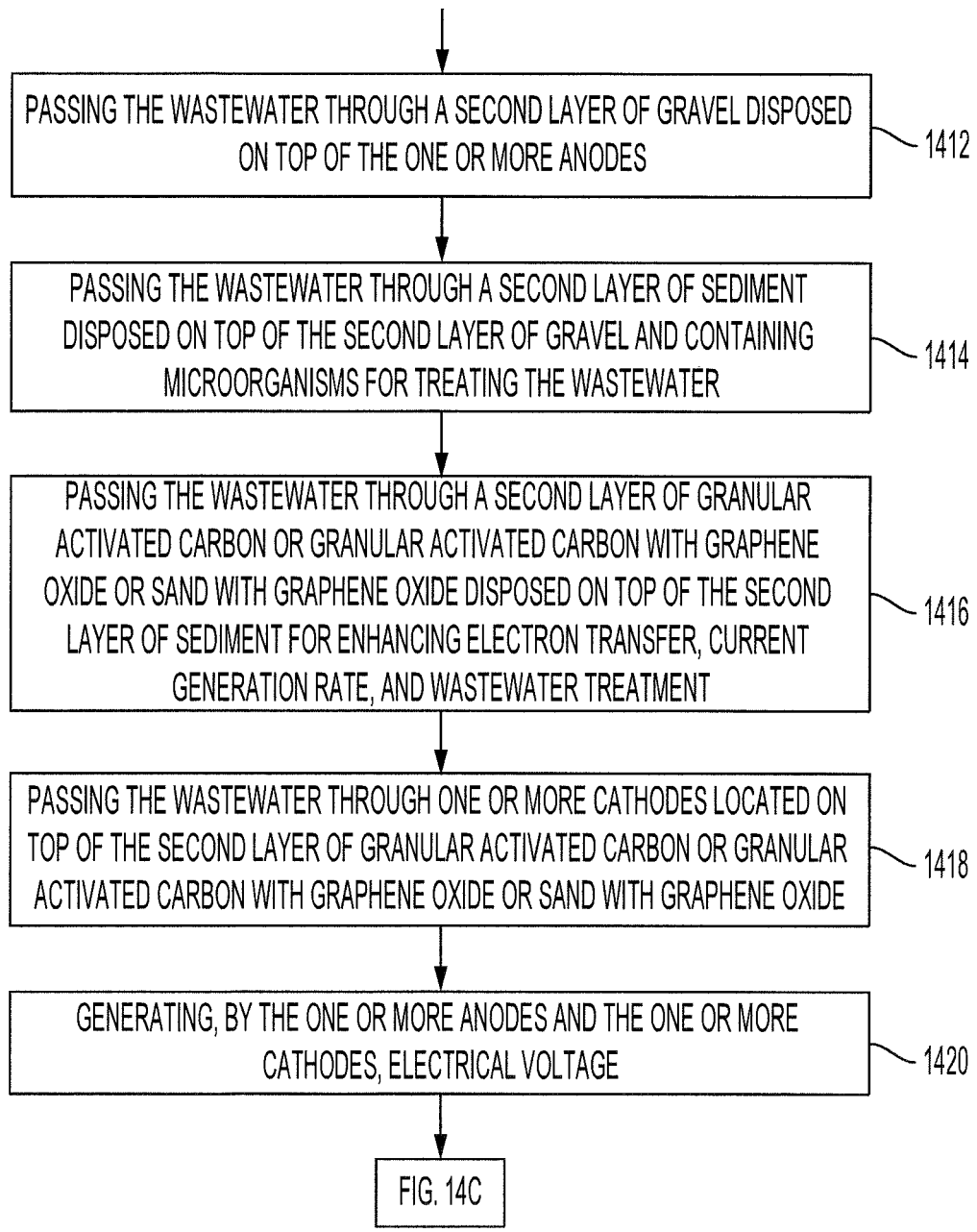
Figure 14C:
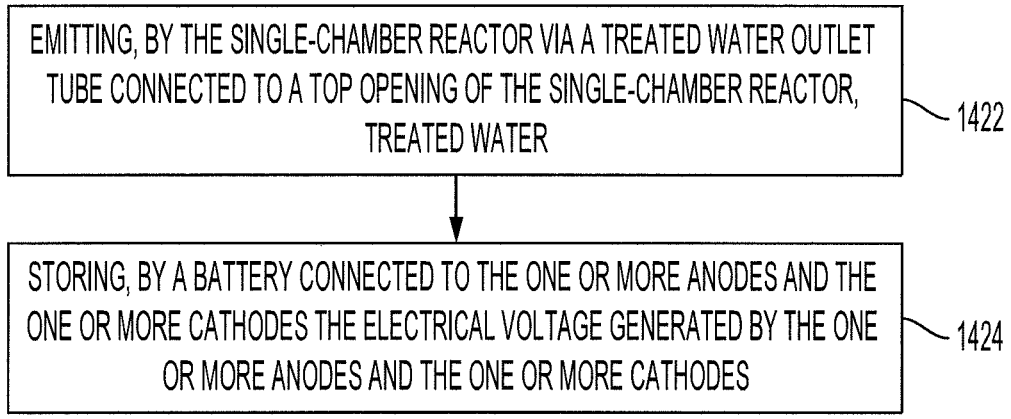

FIGS. 14A-14C illustrate a flowchart of a process 1400 for treating wastewater and generating electricity.

A single-chamber reactor (e.g., single-chamber reactor 116, 316, 1316) receives wastewater (e.g., wastewater 132, 332) to be treated via a wastewater inlet tube (e.g., wastewater inlet tube 128, 328) connected to a bottom opening (e.g., bottom opening 124, 324) of the single-chamber reactor (step 1402).

The wastewater passes through a first layer of gravel (e.g., gravel 110, 310) disposed on a bottom surface (e.g., bottom surface 120, 320) of the single-chamber reactor (step 1404). The first layer of gravel allows the wastewater to enter the single-chamber reactor in a steady and even manner. The wastewater inlet tube, in some embodiments, has multiple branches to provide an evenly distributed flow of wastewater around the electrodes, as described herein.

The wastewater passes through a first layer of sediment (e.g., first layer of sediment 304A) above the first layer of gravel (step 1406). The first layer of sediment includes microorganisms for treating the wastewater.

The wastewater then passes through a first layer of granular activated carbon or granular activated carbon with graphene oxide or sand with graphene oxide (e.g., granular activated carbon granular activated carbon or granular activated carbon with graphene oxide or sand with graphene oxide 342A) disposed on top of the first layer of sediment (step 1408). The granular activated carbon or granular activated carbon with graphene oxide or sand with graphene oxide enhances electron transfer, current generation, and wastewater treatment.

The wastewater then passes through one or more anodes (e.g., anodes 102, 302, 1302) located on top of the first layer of granular activated carbon or granular activated carbon with graphene oxide or sand with graphene oxide (step 1410).

The wastewater then passes through a second layer of gravel disposed on top of the one or more anodes (step 1412). The gravel provides support for the sediment on top of the gravel, as well as facilitating flow of wastewater.

The wastewater then passes through a second layer of sediment (e.g., second layer of sediment 304B) disposed on top of the second layer of gravel (step 1414). The second layer of sediment is similar to the first layer of sediment and contains microorganisms for treating wastewater.

The wastewater then passes through a second layer of granular activated carbon or granular activated carbon with graphene oxide or sand with graphene oxide which enhances electron transfer, current generation, and wastewater treatment (step 1416). The granular activated carbon or granular activated carbon with graphene oxide or sand with graphene oxide enhances electron transfer, current generation, and wastewater treatment.

The wastewater then passes through one or more cathodes (e.g., cathodes 106, 306, 1306) located on top of the second layer of granular activated carbon or granular activated carbon with graphene oxide or sand with graphene oxide (step 1418). As described herein, the anodes and the cathodes may be made of carbon-based materials.

The one or more anodes and the one or more cathodes generate electrical voltage (step 1420).

The single-chamber reactor emits treated water via a treated water outlet tube (e.g., treated water outlet tube 130, 330) connected to a top opening (e.g., top opening 126, 326) of the single-chamber reactor (step 1422). The passing of the wastewater through the first layer of sediment and the second layer of sediment treats the wastewater and converts it into treated water.

The electrical voltage generated by the one or more anodes and the one or more cathodes in step 1420 is stored by a battery (step 1424). The battery may be used to power one or more electrical devices, such as a fluid pump or an air pump.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A plant-sediment microbial fuel cell system comprising:
a single chamber reactor having:
a bottom surface and one or more walls defining a cavity,
a bottom opening near a bottom end of the reactor, and
a top opening near a top end of the reactor;
a wastewater inlet tube connected to the bottom opening and configured to supply the single chamber reactor with wastewater to be treated;
a treated water outlet tube connected to the top opening and configured to emit treated water;
a first layer of gravel disposed on the bottom surface of the single chamber reactor;
a first layer of sediment disposed on top of the first layer of gravel and containing microorganisms for treating the wastewater;
a first layer of granular activated carbon or granular activated carbon with graphene oxide or sand with graphene oxide disposed on top of the first layer of sediment for enhancing electron transfer, current generation rate, and wastewater treatment;
one or more anodes located on top of the first layer of granular activated carbon or granular activated carbon with graphene oxide or sand with graphene oxide;
a second layer of gravel disposed on top of the one or more anodes;
a second layer of sediment disposed on top of the second layer of gravel and containing microorganisms for treating the wastewater;
a second layer of granular activated carbon or granular activated carbon with graphene oxide or sand with graphene oxide disposed on top of the second layer of sediment for enhancing electron transfer, current generation rate, and wastewater treatment;
one or more cathodes located on top of the second layer of granular activated carbon or granular activated carbon with graphene oxide or sand with graphene oxide, the one or more anodes and the one or more cathodes configured to generate electrical voltage; and
a battery connected to the one or more anodes and the one or more cathodes and configured to store the electrical voltage generated by the one or more anodes and the one or more cathodes.

2. The system of claim 1, further comprising:
an air pump located near the top end of the reactor and configured to aerate water proximal to the one or more cathodes; and
a solar collector configured to convert solar energy into electrical energy to power the air pump.

3. The system of claim 1, wherein the battery is further configured to power one or more pumps including an air pump and/or a fluid pump.

4. The system of claim 1, further comprising plants having roots located in the second layer of sediment, and extended to below the second layer of sediment, and configured to improve the efficiency of treating the wastewater.

5. The system of claim 1, wherein the first layer of granular activated carbon and the second layer of granular activated carbon are each coated with graphene oxide nanosheets or sand coated with graphene oxide nanoparticles.

6. The system of claim 1, wherein the wastewater inlet tube comprises a plurality of branches for providing an even liquid flow within the single chamber reactor.

7. The system of claim 1, wherein the one or more anodes and the one or more cathodes are made of carbon-based materials.

8. The system of claim 1, wherein the one or more anodes are four anodes spaced apart by 1.5 inches, and wherein the one or more cathodes are four cathodes spaced apart by 1.5 inches, and wherein each of the one or more anodes and the one or more cathodes are 2 inches wide, 2 inches long, and ¼ inch thick.

9. A plant-sediment microbial fuel cell comprising:
a single chamber reactor having:
a bottom surface and one or more walls defining a cavity,
a bottom opening near a bottom end of the reactor, and
a top opening near a top end of the reactor, wastewater entering the single-chamber reactor from the bottom opening and exiting the single-chamber reactor as treated water from the top opening;

a first layer of gravel disposed on the bottom surface of the single chamber reactor;

a first layer of sediment disposed on top of the first layer of gravel and containing microorganisms for treating the wastewater;

a first layer of granular activated carbon or granular activated carbon with graphene oxide or sand with graphene oxide disposed on top of the first layer of sediment for enhancing electron transfer, current generation rate, and wastewater treatment;

one or more anodes located on top of the first layer of granular activated carbon or granular activated carbon with graphene oxide or sand with graphene oxide;

a second layer of gravel disposed on top of the one or more anodes;

a second layer of sediment disposed on top of the second layer of gravel and containing microorganisms for treating the wastewater;

a second layer of granular activated carbon or granular activated carbon with graphene oxide or sand with graphene oxide disposed on top of the second layer of sediment for enhancing electron transfer, current generation rate, and wastewater treatment; and one or more cathodes located on top of the second layer of granular activated carbon or granular activated carbon with graphene oxide or sand with graphene oxide, the one or more anodes and the one or more cathodes configured to generate electrical voltage.

10. The plant-sediment microbial fuel cell of claim 9, further comprising a wastewater inlet tube connected to the bottom opening and configured to supply the single chamber reactor with the wastewater to be treated.

11. The plant-sediment microbial fuel cell of claim 9, further comprising:
an air pump located near the top end of the reactor and configured to aerate water proximal to the one or more cathodes; and
a solar collector configured to convert solar energy into electrical energy to power the air pump.

12. The plant-sediment microbial fuel cell of claim 9, further comprising a battery connected to the one or more anodes and the one or more cathodes and configured to:
store the electrical voltage generated by the one or more anodes and the one or more cathodes, and
power one or more pumps including an air pump and/or a fluid pump.

13. The plant-sediment microbial fuel cell of claim 9, further comprising plants having roots located in the second layer of sediment, and extended to below the second layer of sediment, and configured to improve the efficiency of treating the wastewater.

14. The plant-sediment microbial fuel cell of claim 9, wherein the first layer of granular activated carbon and the second layer of granular activated carbon are each coated with graphene oxide nanosheets or sand coated with graphene oxide nanoparticles.

15. The plant-sediment microbial fuel cell of claim 9, wherein the wastewater inlet tube comprises a plurality of branches for providing an even liquid flow within the single chamber reactor.

16. The plant-sediment microbial fuel cell of claim 9, wherein the one or more anodes and the one or more cathodes are made of carbon-based materials.

17. The plant-sediment microbial fuel cell of claim 9, wherein the one or more anodes are four anodes spaced apart by 1.5 inches, and wherein the one or more cathodes are four cathodes spaced apart by 1.5 inches, and wherein each of the one or more anodes and the one or more cathodes are 2 inches wide, 2 inches long, and ¼ inch thick.

18. A method for treating wastewater and generating electricity, the method comprising:
receiving, by a single-chamber reactor via a wastewater inlet tube connected to a bottom opening of the single-chamber reactor, wastewater to be treated;
passing the wastewater through a first layer of gravel disposed on a bottom surface of the single-chamber reactor;
passing the wastewater through a first layer of sediment above the first layer of gravel, the first layer of sediment containing microorganisms for treating the wastewater;
passing the wastewater through a first layer of granular activated carbon or granular activated carbon with graphene oxide or sand with graphene oxide disposed on top of the first layer of sediment for enhancing electron transfer, current generation rate, and wastewater treatment;
passing the wastewater through one or more anodes located on top of the first layer of granular activated carbon or granular activated carbon with graphene oxide or sand with graphene oxide;
passing the wastewater through a second layer of gravel disposed on top of the one or more anodes;
passing the wastewater through a second layer of sediment disposed on top of the second layer of gravel and containing microorganisms for treating the wastewater;
passing the wastewater through a second layer of granular activated carbon or granular activated carbon with graphene oxide or sand with graphene oxide disposed on top of the second layer of sediment for enhancing electron transfer, current generation rate, and wastewater treatment;
passing the wastewater through one or more cathodes located on top of the second layer of granular activated carbon or granular activated carbon with graphene oxide or sand with graphene oxide;
generating, by the one or more anodes and the one or more cathodes, electrical voltage; and
emitting, by the single-chamber reactor via a treated water outlet tube connected to a top opening of the single-chamber reactor, treated water.

19. The method of claim 18, further comprising storing, by a battery connected to the one or more anodes and the one or more cathodes the electrical voltage generated by the one or more anodes and the one or more cathodes.

20. The method of claim 18, further comprising:
aerating, by an air pump located near the top end of the reactor, water proximal to the one or more cathodes;
converting, by a solar collector, solar energy into electrical energy; and
powering, by the solar collector, the air pump.

* * * * *